United States Patent
Kang

(10) Patent No.: US 9,900,917 B2
(45) Date of Patent: Feb. 20, 2018

(54) ELECTRONIC DEVICE FOR PERFORMING A COMMUNICATION CONNECTION AND METHOD FOR ESTABLISHING A COMMUNICATION CONNECTION

(71) Applicant: SAMSUNG ELECTRONICS CO., LTD., Suwon-si, Gyeonggi-do (KR)

(72) Inventor: Si-Won Kang, Incheon (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 100 days.

(21) Appl. No.: 14/882,703

(22) Filed: Oct. 14, 2015

(65) Prior Publication Data

US 2016/0113045 A1   Apr. 21, 2016

(30) Foreign Application Priority Data

Oct. 15, 2014   (KR) .................... 10-2014-0139207

(51) Int. Cl.

| H04W 76/02 | (2009.01) |
|---|---|
| H04W 12/04 | (2009.01) |
| H04W 84/12 | (2009.01) |
| H04W 48/16 | (2009.01) |
| H04W 48/20 | (2009.01) |

(52) U.S. Cl.
CPC .......... *H04W 76/02* (2013.01); *H04W 12/04* (2013.01); *H04W 48/16* (2013.01); *H04W 48/20* (2013.01); *H04W 84/12* (2013.01)

(58) Field of Classification Search
CPC .................................................. H04W 76/02
USPC ........................................................ 370/338
See application file for complete search history.

(56) References Cited

U.S. PATENT DOCUMENTS

| 2003/0131082 A1* | 7/2003 | Kachi ................ H04L 63/0876 709/220 |
| 2008/0205649 A1* | 8/2008 | Harris ................ H04L 63/0442 380/270 |
| 2013/0057591 A1* | 3/2013 | Sugiyama ............ H04W 48/20 345/671 |
| 2013/0188628 A1* | 7/2013 | Lee ...................... H04W 48/14 370/338 |
| 2013/0333016 A1 | 12/2013 | Coughlin et al. |
| 2015/0245282 A1* | 8/2015 | Kim .................... H04W 48/14 370/338 |

OTHER PUBLICATIONS

IEEE Std 802.1X-2010, Feb. 5, 2010; pp. 48-52.*

* cited by examiner

*Primary Examiner* — Mark Rinehart
*Assistant Examiner* — Peter G Solinsky
(74) *Attorney, Agent, or Firm* — Nixon & Vanderhye, P.C.

(57) ABSTRACT

An electronic device is provided that includes a communication module; a memory configured to store communication connection information for communication connection with an external electronic device; and a processor configured to, upon a communication connection request with the external electronic device, perform communication connection with the external electronic device using pre-stored communication connection information, if the pre-stored communication connection information exists.

21 Claims, 13 Drawing Sheets

FIG. 11

ELECTRONIC DEVICE FOR PERFORMING A COMMUNICATION CONNECTION AND METHOD FOR ESTABLISHING A COMMUNICATION CONNECTION

CROSS-REFERENCE TO RELATED APPLICATION

This application is based on and claims priority under 35 U.S.C. § 119 to a Korean patent application filed in the Korean Intellectual Property Office on Oct. 15, 2014 and assigned Serial No. 10-2014-0139207, the disclosure of which is incorporated herein by reference in its entirety.

TECHNICAL FIELD

The disclosure relates to an electronic device for performing a communication connection and a method for establishing a communication connection.

BACKGROUND

In recent years, electronic devices related to wireless fidelity (WiFi) communication have come into wide use. WiFi communication, which is communication based on the IEEE 802.11 standard, may perform communication by transmitting and receiving a wireless signal containing data in a wireless frequency band of 2.4 GHz and 5 GHz. WiFi communication may be performed between a client and an access point (AP). The client may be connected to the web based on WiFi communication with the AP. WiFi electronic devices perform a specific procedure for exchanging with each other the wireless packets containing the necessary information according to a defined protocol, for wireless communication. Similarly, a necessary procedure is defined even during connection between electronic devices. For example, processes of searching for, recognizing and authenticating an opponent device, making a connection request, and exchanging an encryption key are defined during the connection between electronic devices, and an electronic device may make a WiFi communication connection by performing all of the defined procedures.

WiFi communication performs processes of searching for, recognizing and authenticating an opponent device, making a connection request, and exchanging an encryption key, which are the defined procedures, to make a communication connection. On the other hand, WiFi communication is defined to perform again the processes of searching for, recognizing and authenticating an opponent device, making a connection request, and exchanging an encryption key, even when an electronic device makes a reconnection with the opponent device, with which its communication connection has been made previously.

The above information is presented as background information only to assist with an understanding of the disclosure. No determination has been made, and no assertion is made, as to whether any of the above might be applicable as prior art with regard to the disclosure.

SUMMARY

An aspect of the disclosure is to address at least the above-mentioned problems and/or disadvantages and to provide at least the advantages described below. Accordingly, an aspect of the disclosure is to provide an electronic device for performing a communication connection and a method for establishing a communication connection.

In accordance with an aspect of the disclosure, an electronic device is provided, which may include a communication module comprising communication circuitry; a memory configured to store communication connection information for communication connection with an external electronic device; and a processor configured to, upon receiving a communication connection request with the external electronic device, perform communication connection with the external electronic device using pre-stored communication connection information, if the pre-stored communication connection information exists.

In accordance with another aspect of the disclosure, a method for establishing a communication connection in an electronic device is provided. The method may include storing communication connection information for communication connection with an external electronic device; and upon receiving a communication connection request with the external electronic device, performing communication connection with the external electronic device using pre-stored communication connection information, if the pre-stored communication connection information exists.

In accordance with another aspect of the disclosure, a storage medium is provided for storing a communication connection program in an electronic device. The program may include storing communication connection information for communication connection with an external electronic device; and upon receiving a communication connection request with the external electronic device, performing communication connection with the external electronic device using pre-stored communication connection information, if the pre-stored communication connection information exists.

In accordance with yet another aspect of the disclosure, a method for establishing a communication connection with an access point (AP) in a wireless fidelity (WiFi) client is provided. The method may include obtaining an AP selection command for the AP; obtaining a Service Set Identifier (SSID) of the AP from the obtained AP selection command, and sending a Probe Request signal including the SSID of the AP; receiving a Probe Response signal from the AP; parsing the received Probe Response signal and storing second communication connection information based on the parsing result; sending an Authentication signal to the AP, and receiving an Authentication signal from the AP; sending an Association Request signal to the AP; receiving an Association Response signal from the AP; parsing the received Association Response signal and storing fourth communication connection information based on the parsing result; and generating an encryption key and sending the encryption key to the AP.

In accordance with still another aspect of the disclosure, a method for establishing a communication connection with a client in a wireless fidelity (WiFi) access point (AP) is provided. The method may include receiving a Probe Request signal including a Service Set Identifier (SSID) of the AP; parsing the received Probe Request signal and storing first communication connection information based on the parsing result; sending a Probe Response signal to the client; receiving an Authentication signal from the client, and sending an Authentication signal to the client; receiving an Association Request signal from the client; parsing the received Association Request signal, and storing third communication connection information based on the parsing result; sending an Association Response signal to the client; and receiving an encryption key from the client.

In accordance with still another aspect of the disclosure, a method for establishing a communication connection with an access point (AP) in a wireless fidelity (WiFi) client is provided. The method may include obtaining an AP selection command for the AP; obtaining a Service Set Identifier (SSID) of the AP from the obtained AP selection command, and determining whether the SSID exists in a pre-stored AP list; if the SSID exists in the AP list, obtaining second and fourth communication connection information corresponding to the SSID; and generating an encryption key based on at least one of the obtained second and fourth communication connection information, and sending the encryption key to the AP.

In accordance with still another aspect of the disclosure, a method for establishing a communication connection with a client in a wireless fidelity (WiFi) access point (AP) is provided. The method may include receiving an encryption key including a Service Set Identifier (SSID) of the client; determining whether the SSID obtained from the received encryption key exists in a pre-stored client list; if the SSID exists in the client list, obtaining first and third communication connection information corresponding to the SSID; and generating an encryption key based on at least one of the obtained first and third communication connection information, and transmitting the encryption key to the client.

Other aspects, advantages, and features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects, features and advantages of certain example embodiments will be more apparent from the following description taken in conjunction with the accompanying drawings, in which like reference numerals refer to like elements, and wherein:

FIG. 11 illustrates association response values during initial connection and reconnection according to various example embodiments;

DETAILED DESCRIPTION

Figure 1:
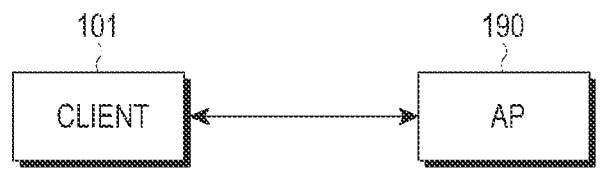
FIG. 1 is a block diagram illustrating a communication connection system according to various example embodiments.

Example embodiments of the disclosure are described with reference to the accompanying drawings. Various changes may be made to the disclosure, and the disclosure may come with a diversity of example embodiments. Some example embodiments of the disclosure are shown and described in connection with the drawings. However, it should be appreciated that the disclosure is not limited to the example embodiments, and all changes and/or equivalents or replacements thereto also belong to the scope of the disclosure. The same or similar reference denotations are used to refer to the same or similar elements throughout the specification and the drawings.

The terms "comprise" and/or "comprising" as used herein specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "A or B" or "at least one of A and/or B" includes any and all combinations of one or more of the associated listed items. For examples, "A or B" or "at least one of A or/and B" each may include A, or include B, or include both A and B.

Ordinal numbers as herein used, such as "first", "second", etc., may modify various components of various example embodiments, but do not limit those components. For example, these terms do not limit the order and/or importance of the components. These terms are only used to distinguish one component from another. For example, a first user device and a second user device are different user devices from each other. For example, according to various example embodiments, a first component may be denoted a second component, and vice versa without departing from the scope of the disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some example embodiments thereof, but not to limit the disclosure. It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the example embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various example embodiments may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., smart glasses, a head-mounted-device (HMD), electronic clothing, an electronic bracelet, an electronic necklace, an E-App accessory (or appcessory), electronic tattoo, a smart mirror, or a smart watch).

In some example embodiments, the electronic device may be a smart home appliance. The smart home appliance may include at least one of, for example, a television (TV), a digital video disk (DVD) player, an audio player, a refrigerator, an air conditioner, a cleaner, an oven, a microwave oven, a washer, an air purifier, a set-top box, a home automation control panel, a security control panel, a TV box (e.g., Samsung HomeSync™, Apple TV™, or Google TV™), a game console (e.g., Xbox™, or PlayStation™), an electronic dictionary, an electronic key, a camcorder or electronic paper.

In another example embodiment, the electronic device may include at least one of various medical devices (e.g., various portable medical meters (or a blood glucose meter, a heart rate meter, a blood pressure meter, or a body temperature meter), magnetic resonance angiography (MRA), magnetic resonance imaging (MRI), computed tomography (CT), medical camcorder, or a medical ultrasound device), a navigation device, a global positioning system (GPS) receiver, an event data recorder (EDR), a flight data recorder (FDR), an automotive infotainment device, a marine electronic device (e.g., a marine navigation device, a gyro compass and the like), avionics, a security device, a car head unit, an industrial or household robot, an automatic teller's machine for banks, or a point of sales (POS) of shops, or an Internet of things (IoT) device (e.g., an electric bulb, various sensors, an electricity or gas meter, a sprinkler device, a fire alarm, a thermostat, a street lamp, a toaster, fitness equipment, a hot water tank, a heater, a boiler and the like).

In some example embodiments, the electronic device may include at least one of a part of the furniture or building/structure, an electronic board, an electronic signature receiving device, a projector, or various meters (e.g., meters for water, electricity, gas or radio waves). In some example embodiments, the electronic device may be one or combination of the above-described various devices. An electronic device according to some example embodiments may be a flexible electronic device. The electronic device according to an example embodiment of the disclosure is not limited to the above-described devices, and may include new electronic devices in line with the development of technology.

The electronic device according to various example embodiments will now be described with reference to the accompanying drawings. As used herein, the term 'user' may refer to a person who uses the electronic device, or a device (e.g., an intelligent electronic device) that uses the electronic device.

FIG. 1 is a block diagram of a communication connection system according to various example embodiments.

Referring to FIG. 1, a communication connection system according to various example embodiments may include a client 101 and an access point (AP) 190. The client 101 may make a communication connection with the AP 190. The client 101 may make a communication connection with the AP 190 based on a WiFi communication. The client 101 may perform a procedure defined in WiFi communication, with the AP 190. The client 101 may transmit and receive a data packet defined in WiFi communication, to/from the AP 190. For example, the client 101 may send a Probe Request to the AP 190, receive a Probe Response from the AP 190, and then send an acknowledgement (Ack) to the AP 190. For example, the client 101 may send and receive Authentication and Ack to/from the AP 190. For example, the client 101 may send and receive an Association Request and an Ack to/from the AP 190. For example, the client 101 may send and receive an Association Response and an Ack to the AP 190. For example, the client 101 may transmit and receive an encryption key or an extensible authentication protocol over local area network key (EAPOL-Key) to/from the AP 190. The above-described, Probe Request, Probe Response, Authentication, Association Request and Association Response will be described in more detail below. In a case where the client 101 is an electronic device, the AP 190 may be referred to as an 'opponent device' or 'external electronic device'. Conversely, in a case where the AP 190 is an electronic device, the client 101 may be referred to as an 'opponent device' or 'external electronic device'.

The client 101 according to various example embodiments may store communication connection information corresponding to information on the AP 190, with which its connection has been made previously, in association with each other. The AP 190 may store communication connection information corresponding to identification information of the client 101, with which its connection has been made previously, in association with each other.

Identification information of the AP 190 may include at least one of a Service Set Identifier (SSID) and a Media Access Control (MAC) address of the AP 190. Identification information of the client 101 may include at least one of an SSID and a MAC address of the client 101.

The communication connection information may be, for example, information required for generation of an encryption key. In one example embodiment, the communication connection information may include information parsed from a Probe Request and a Probe Response. For example, the information parsed from a Probe Request and a Probe Response may include at least one of Capability information, SSID information, Supported Rates information, Robust Security Network (RSN) information, High-Throughput (HT) Capability Information, additional HT information, Wi-Fi Protected Access (WPA) information, Vendor Specific information, and Wi-Fi Multimedia (WMM) information. In one example embodiment, communication connection information may include information parsed from an Association Request and an Association Response. For example, the information parsed from an Association Request and an Association Response may include at least one of Capability information, SSID information, Supported Rates information, RSN information, HT Capability information, Vendor Specific information and WMM information.

The Capability information, which is a field value existing in a management frame, may indicate a short preamble, Quality of Service (QoS), ESS/IBSS, WEP security and the like. The SSID may be identifiable identification information broadcast by the AP 190. The Supported Rates information may include a supported data rate. The RSN information may include a security scheme. The HT Capability information, which is Capability information for IEEE 802.11n fast communication, may indicate a 20/40 MHz bandwidth, guard interval setting, a delayed block Ack operation, spatial multiplexing and the like. The WPA information may mean an encryption authentication scheme, and the Vendor Specific information may indicate information required to perform a unique function in an AP vendor. The WMM information may include power-saving operation-related information.

The client 101 according to various example embodiments may load the stored communication connection information, when the client 101 attempts a reconnection with the AP 190, with which its connection has been made previously. The client 101 may make a communication connection with the AP 190 based on the loaded communication connection information. The client 101 may generate an encryption key based on the loaded communication connection information, and send the generated encryption key to the AP 190. If a packet first received from the client 101 is an encryption key, the AP 190 according to the known art may discard the received encryption key. If a packet first received from the client 101 is an encryption key, the AP 190 according to various example embodiments may determine whether the client 101 is a client, with which its connection has been made previously, without discarding the encryption key. If it is determined that the client 101 is a client, with which its connection has been made previously, the AP 190 may send an encryption key of the AP 190 to the client 101. Accordingly, the client 101 and the AP 190 may omit some of the procedure defined by WiFi communication.

As described above, the client 101 or the AP 190 according to various example embodiments may store information of an opponent device, with which its connection has been made previously, and the corresponding communication connection information, in association with each other. In addition, the client 101 or the AP 190 may make a connection based on the stored communication connection information during a reconnection with the opponent device, with which its connection has been made previously, thereby making it possible to make a communication connection while omitting some of the procedure defined by WiFi communication.

Figure 2:
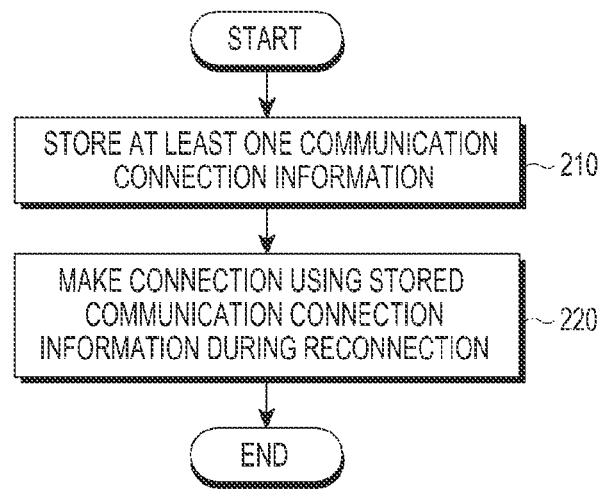
FIG. 2 is a flowchart illustrating a communication connection method according to various example embodiments.

FIG. 2 is a flowchart illustrating a communication connection method according to various example embodiments.

In operation 210, an electronic device may store at least one communication connection information of an opponent electronic device in a process of making an initial connection with the opponent electronic device. The electronic device may store identification information and communication connection information of the opponent electronic device in association with each other.

In operation 220, the electronic device may make a communication connection using the stored communication connection information in a process of making a reconnection with the opponent electronic device, with which its connection has been made previously. The electronic device may obtain a connection command received from the user, and may obtain identification information of the opponent electronic device from the obtained connection command. Alternatively, the electronic device may receive a connection request from the opponent electronic device, and obtain identification information of the opponent electronic device from the received connection request. In addition, the electronic device may determine whether the electronic device has stored the communication connection information corresponding to the obtained identification information. If the electronic device has stored the communication connection information, the electronic device may make a communication connection by loading the stored communication connection information.

Figure 3:
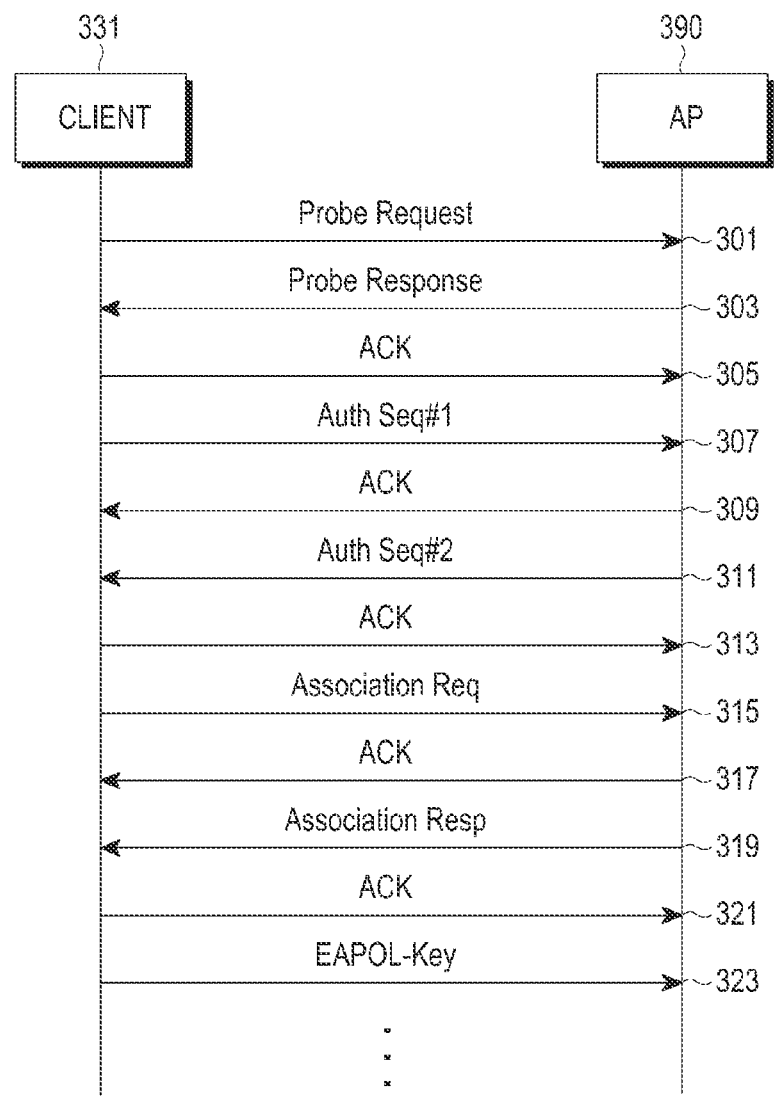
FIG. 3 is a signaling diagram illustrating a communication connection method.

FIG. 3 is a signaling diagram illustrating a communication connection method made for comparison.

In operation 301, a client 331 may send a Probe Request to an AP 390. The Probe Request may include an IEEE 802.11 MAC header with a MAC address of the client 331, SSID information, Supported Rates information and HT Capability information. Here, the HT Capability information may be included in the Probe Request, if the client 331 supports IEEE 802.11n.

In operation 303, the AP 390 may send a Probe Response to the client 331. The Probe Response may have a field advertising the capability of the AP 390. A value of the field may be obtained referring not only to the Probe Response, but also to a beacon value that is transmitted and received on a regular basis for a predetermined period. The Probe Response may include at least one of Capability information, Supported Rates information, encryption information (e.g., RSN information, ERP information or the like), WPA information, WMM information and Vendor Specific information. The AP 390 may additionally include a QBSS load and a country value in the Probe Response.

In operation 305, the client 331 may send an Ack to the AP 390.

In operation 307, the client 331 may send a first Authentication to the AP 390. In operation 309, the AP 390 may send an Ack to the client 331. In operation 311, the AP 390 may send a second Authentication to the client 331. In operation 313, the client 331 may send an Ack to the AP 390. Here, the first and second Authentications may include a sequence, and may increase one by one during transmission/reception. For example, if a sequence of the first Authentication is 1, a sequence of the second Authentication may be 2. The Authentication may inform the opponent device of the execution of an authentication procedure, and an authentication algorithm and a status code value may be fixed to zero (0).

In operation 315, the client 331 may send an Association Request to the AP 390. In operation 317, the AP 390 may send an Ack to the client 331. The Association Request may include at least one of Capability information, Supported Rates information, HT Capability information, encryption information, WMM information and Vendor Specific information field's value.

In operation 319, the AP 390 may send an Association Response to the client 331. In operation 321, the client 331 may send an Ack to the AP 390. The Association Response may include at least one of Capability information, Supported Rates information, Vendor Specific information, WMM information, HT Capability information, and additional HT information. The additional HT information may be included in the Association Response, if IEEE 802.11n is supported.

In operation 323, the client 331 may send an encryption key EAPOL-Key to the AP 390.

As described above, the client 331 according to the comparative example may perform sending and receiving of a Probe Request and a Probe Response, sending and receiving of an Authentication, and sending and receiving of an Association Request and an Association Response in a process of making an initial communication connection with the AP 390. On the other hand, the client 331 according to the comparative example will re-perform operations 301 to 323 even in a process of requesting a reconnection with the AP 390.

Figure 4:
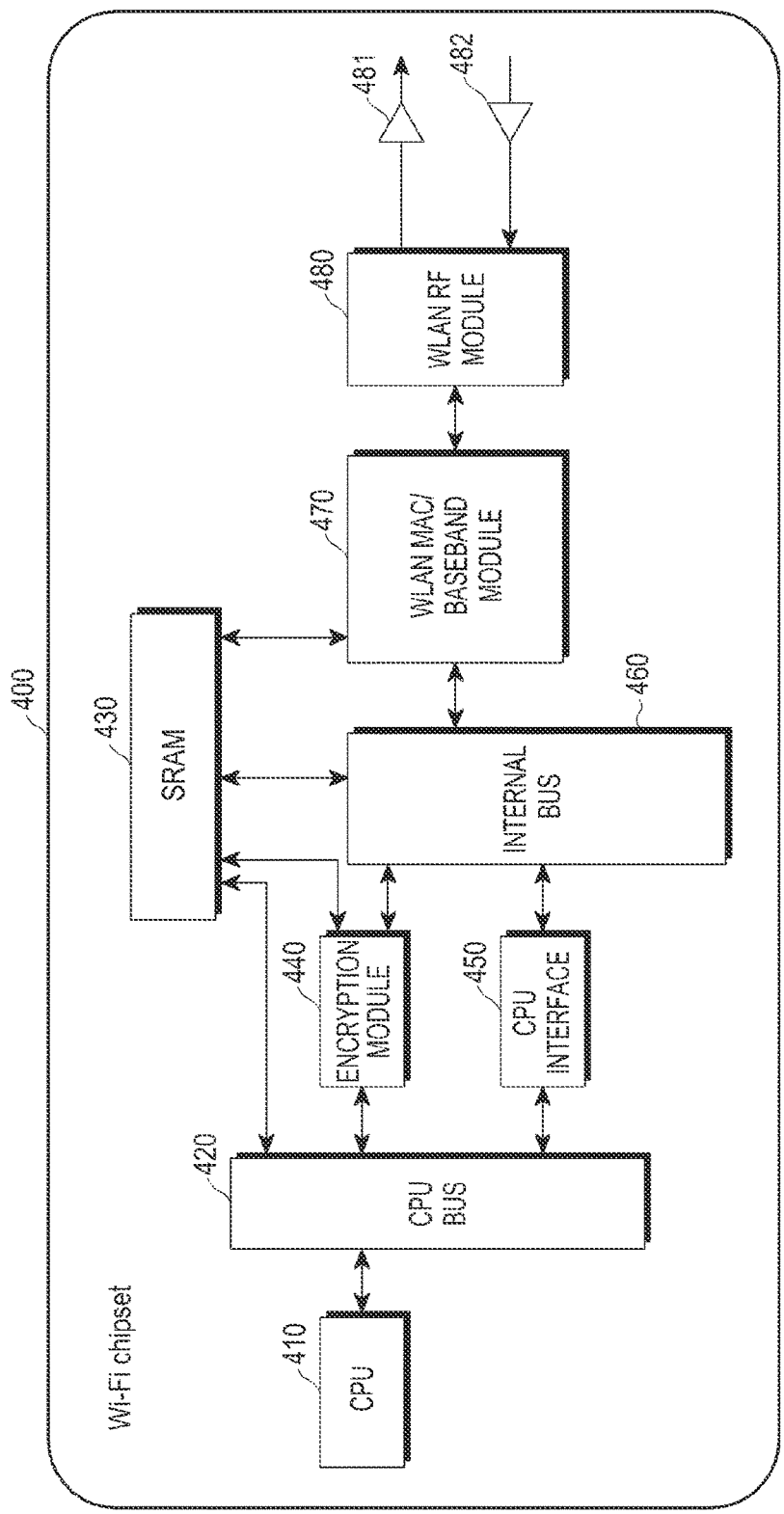
FIG. 4 is a block diagram illustrating a WiFi chipset according to various example embodiments.

FIG. 4 is a block diagram of a WiFi chipset according to various example embodiments.

Referring to FIG. 4, a WiFi chipset 400 may include, for example, a central processing unit (CPU) 410, a CPU bus 420, a static random access memory (SRAM) 430, an encryption module 440, a CPU interface 450, an internal bus 460, a wireless local area network (WLAN) MAC/Baseband module 470, a WLAN RF module 480 and amplifiers 481 and 482.

In an initial connection phase, the WLAN RF module 480 may receive a signal. Here, the received signal may be amplified by the amplifier 482. The WLAN MAC/Baseband module 470 may receive the received signal from the WLAN RF module 480. The WLAN MAC/Baseband module 470 may forward the received signal to the CPU 410 through the internal bus 460, the CPU interface 450 and the CPU bus 420. The WLAN MAC/Baseband module 470 and the CPU 410 may decrypt the received signal.

A field value required for reconnection within a Probe Request and an Association Request in the decrypted signal may be stored in the SRAM 430. Further, a field value required for reconnection within a beacon, a Probe Response and an Association Response in the decrypted signal may be stored in the SRAM 430. The field value required for reconnection may be stored in the SRAM 430 in association with identification information of an opponent device. For example, the field value required for reconnection may be classified based on the MAC address and stored in the SRAM 430.

In the reconnection phase, the CPU 410 may check the MAC address stored in the SRAM 430 to determine the history and whether the electronic device has accessed the opponent device. If it is determined that there is a history that the electronic device has accessed the opponent device, the CPU 410 may load the information required for reconnection from the SRAM 430 instead of waiting for the reception and decryption of a wireless packet from the opponent device. The CPU 410 may control the WLAN MAC/Baseband module 470, the WLAN RF module 480 and the amplifier 481 based on the loaded information so as to send an encryption key EAPOL-Key.

In an example embodiment, the capacity of the information required for reconnection may be limited depending on the capacity of the SRAM 430, and the maximum number of WiFi devices, with which the electronic device has made a connection previously, and the information required for reconnection to which may be stored in the SRAM 430, may be flexibly defined. Packet information required to be stored may be, for example, 200 bytes per a pair of connections in the AP side. 200 bytes may be a sum of IEEE 802.11 MAC header capacities of a Probe Request and an Association Request. In the client side, the required capacity may be, for example, 500 bytes. 500 bytes may be a sum of IEEE 802.11 MAC header capacities of a Probe Response and an Association Response.

Figure 5:
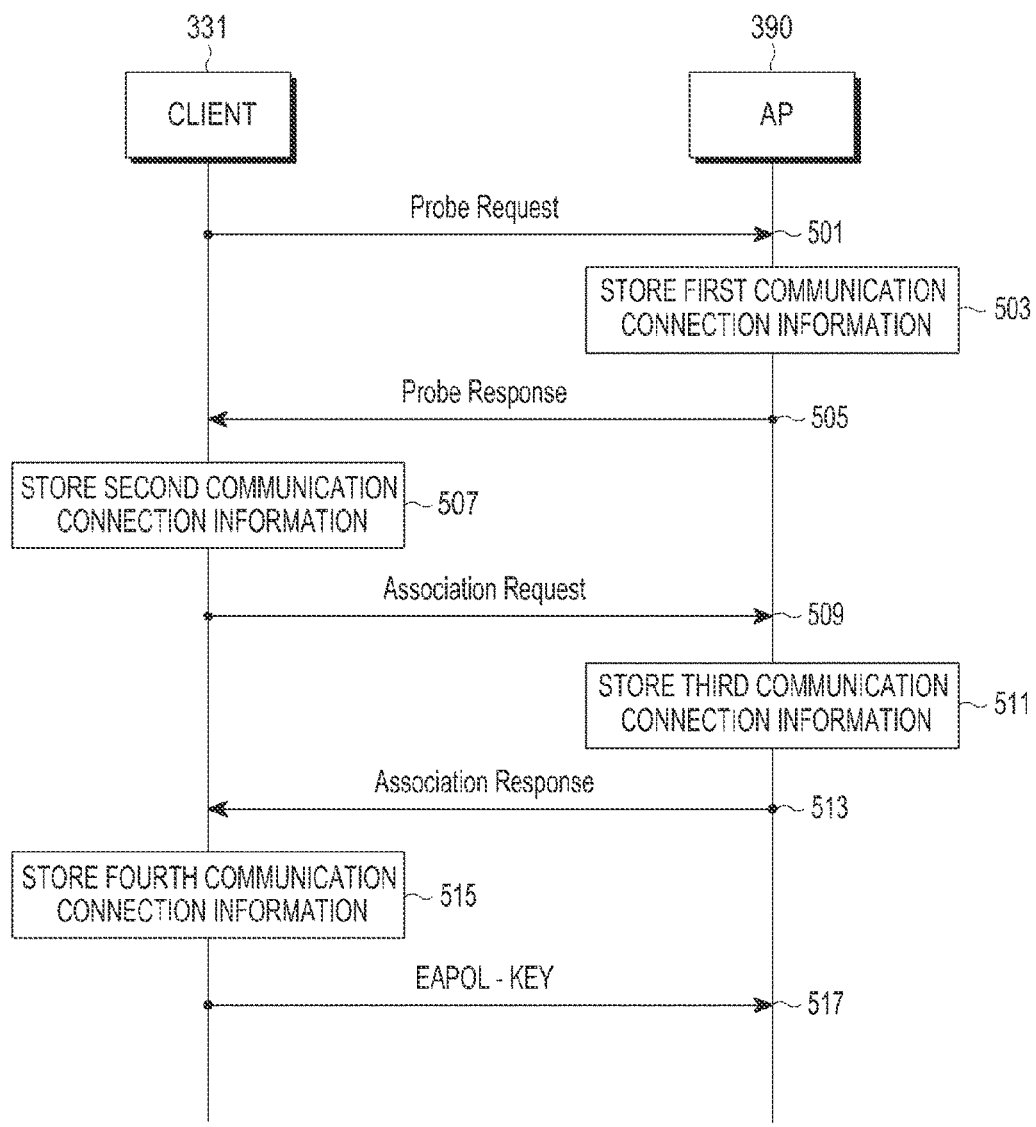
FIG. 5 is a signaling diagram illustrating an operation of an electronic device during initial connection according to various example embodiments.

FIG. 5 is a signaling diagram illustrating an operation of an electronic device during initial connection according to various example embodiments.

In operation 501, the client 101 may send a Probe Request to the AP 190. In operation 503, the AP 190 may obtain first communication connection information from the received Probe Request and store the first communication connection information. The first communication connection information may include at least one of Capability information, SSID information, Supported Rates information, RSN information, HT Capability information, additional HT information, WPA information, Vendor Specific information, and WMM information.

In operation 505, the AP 190 may send a Probe Response to the client 101. In operation 507, the client 101 may obtain second communication connection information from the received Probe Response and store the second communication connection information. The second communication connection information may include at least one of Capability information, SSID information, Supported Rates information, RSN information, HT Capability information, additional HT information, WPA information, Vendor Specific information, and WMM information.

In operation 509, the client 101 may send an Association Request to the AP 190. In operation 511, the AP 190 may obtain third communication connection information from the received Association Request and store the third communication connection information. The third communication connection information may include at least one of Capability information, SSID information, Supported Rates information, RSN information, HT Capability information, Vendor Specific information, and WMM information.

In operation 513, the AP 190 may send an Association Response to the client 101. In operation 515, the client 101 may obtain fourth communication connection information from the received Association Response and store the fourth communication connection information. The fourth communication connection information may include at least one of Capability information, SSID information, Supported Rates information, RSN information, HT Capability information, Vendor Specific information, and WMM information.

In operation 517, the client 101 may send an encryption key EAPOL-Key to the AP 190.

Figure 6:
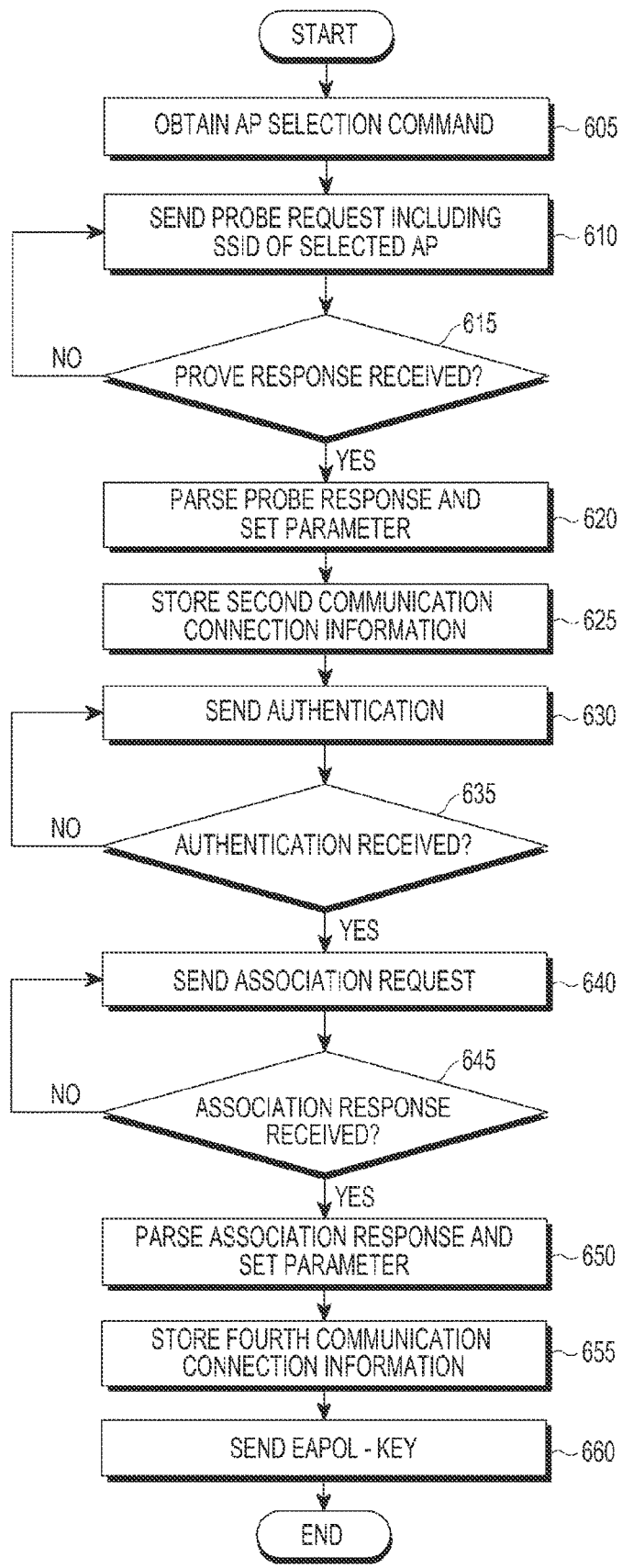
FIG. 6 is a flowchart illustrating an operation of a client during initial connection according to various example embodiments.

FIG. 6 is a flowchart illustrating an operation of a client during initial connection according to various example embodiments.

In operation 605, the client 101 may obtain an AP selection command. For example, the client 101 may receive a beacon from the AP 190. The client 101 may display a list of nearby AP based on the received beacon. The user may check the AP list displayed on the client 101, and select the AP that he/she desires to access, in the AP list. The client 101 may obtain an AP selection command based, for example, on an input from the user. If the number of received beacons is one, the client 101 may obtain an AP selection command corresponding to the received beacon without the input from the user. Even if the number of received beacons is plural, the client 101 may obtain an AP selection command on the basis of predetermined priority, without the input from the user.

In operation 610, the client 101 may generate a Probe Request including an SSID of the selected AP 190, and send the generated Probe Request to the AP 190. The client 101 may generate a Probe Request by inputting an SSID value of the selected AP 190 into an SSID field of the Probe Request, and by inputting the capability information of client 101.

In operation 615, the client 101 may receive a Probe Response from the AP 190. If the client 101 fails to receive a Probe Response from the AP 190 for a predetermined time, the client 101 may resend the Probe Request.

In operation 620, the client 101 may parse the received Probe Response, and set a parameter of an internal function based on the parsing result. In operation 625, the client 101 may store second communication connection information based on the set parameter of an internal function. In one example embodiment, the client 101 may store the second communication connection information in an internal memory of the WiFi chipset.

In operation 630, the client 101 may send an Authentication to the AP 190. In operation 635, the client 101 may receive an Authentication from the AP 190. In one example embodiment, the client 101 may send an Authentication with sequence number=1, and receive an Authentication with sequence number=2. If the client 101 fails to receive an Authentication with sequence number=2, the client 101 may resend an Authentication with sequence number=1.

In operation 640, the client 101 may generate an Association Request based on the information in the Probe Response and the capability of the client 101, and send the generated Association Request to the AP 190.

In operation 645, the client 101 may receive an Association Response from the AP 190. If the Association Response is not received for a predetermined time, the client 101 may resend the Association Request to the AP 190.

In operation 650, the client 101 may parse the Association Response, and set a parameter of an internal function based on the parsing result. In operation 655, the client 101 may store fourth communication connection information based on the set parameter of an internal function.

In operation 660, the client 101 may generate an encryption key EAPOL-Key based on at least one of the second and fourth communication connection information. The client 101 may send the generated encryption key to the AP 190, proceeding with a future encryption phase.

Figure 7:
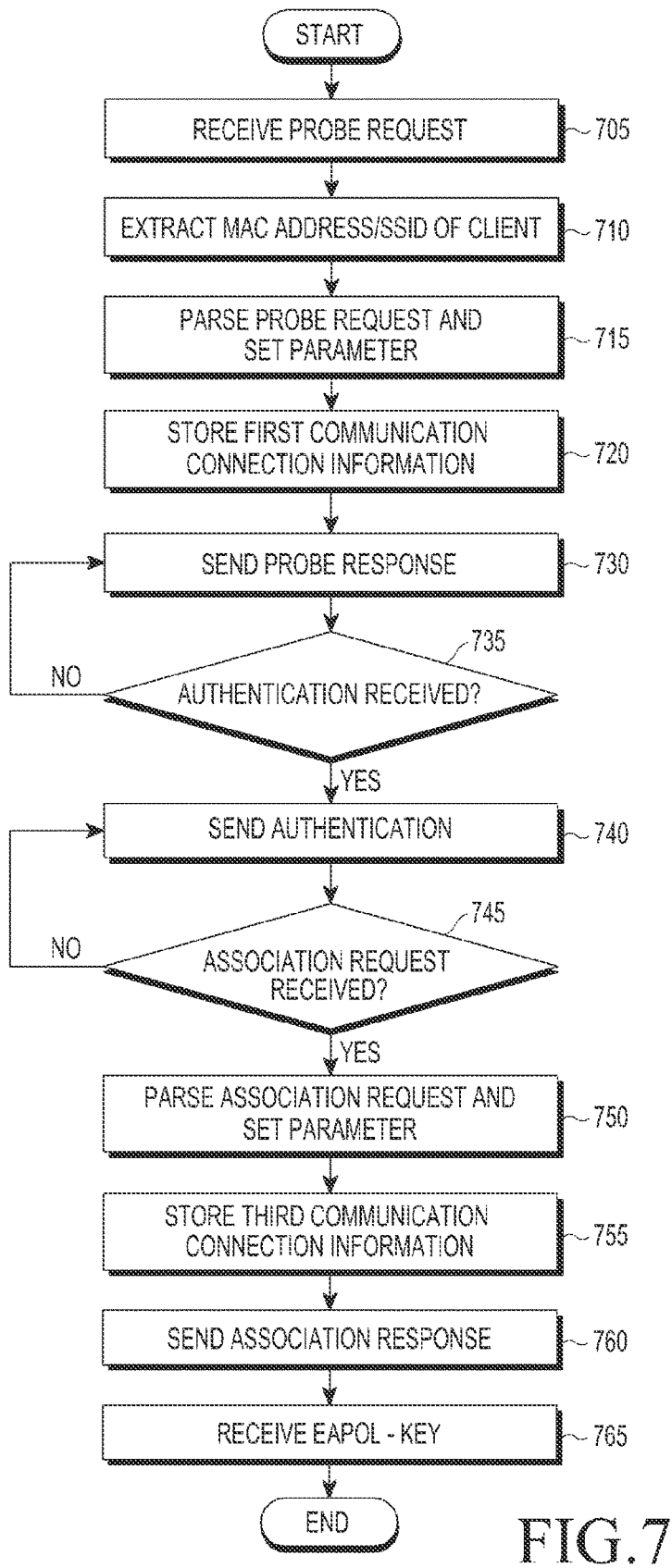
FIG. 7 is a flowchart illustrating an operation of an AP during initial connection according to various example embodiments.

FIG. 7 is a flowchart illustrating an operation of an AP during an initial connection according to various example embodiments.

In operation 705, the AP 190 may receive a Probe Request from the client 101. For example, the AP 190 may receive a beacon from the client 101. The AP 190 may generate a beacon including identification information (e.g., at least one of an SSID and a MAC address of the AP 190) of the AP 190, and transmit the generated beacon. The client 101 may display a list of nearby APs based on the received beacon. The client 101 may determine the AP 190 as a target AP to which the client 101 is to be connected, and thus send a Probe Request to the AP 190. The client 101 may send a Probe Request including identification information of the client 101. Alternatively, the client 101 may send a Probe Request including identification information of the AP 190.

In operation 710, the AP 190 may extract a MAC address and an SSID of the client 101 from the Probe Request. Alternatively, the AP 190 may extract an SSID of the AP 190 from the Probe Request. The AP 190 may determine whether the Probe Request is sent to the AP 190 itself, based on the extracted SSID of the AP 190.

In operation 715, the AP 190 may parse the Probe Request, and set a parameter of an internal function based on the parsing result. In operation 720, the AP 190 may store first communication connection information based on the set parameter. In an example embodiment, the AP 190 may store the first communication connection information in an internal memory of the WiFi chipset.

In operation 730, the AP 190 may send a Probe Response to the client 101.

In operation 735, the AP 190 may receive an Authentication from the client 101. If the Authentication is not received for a predetermined time, the AP 190 may resend the Probe Response to the client 101. In operation 740, the AP 190 may send an Authentication to the client 101. In one example embodiment, the AP 190 may receive an Authentication with sequence number=1, and send an Authentication with sequence number=2.

In operation 745, the AP 190 may receive an Association Request from the client 101. If the Association Request is not received within a predetermined time, the AP 190 may resend the Authentication.

In operation 750, the AP 190 may parse the received Association Request, and set a parameter of an internal function based on the parsing result. In operation 755, the AP 190 may store third communication connection information based on the set parameter.

In operation 760, the AP 190 may send an Association Response to the client 101. In operation 765, the AP 190 may receive an encryption key EAPOL-Key, and proceed with an encryption phase in response thereto.

Figure 8:
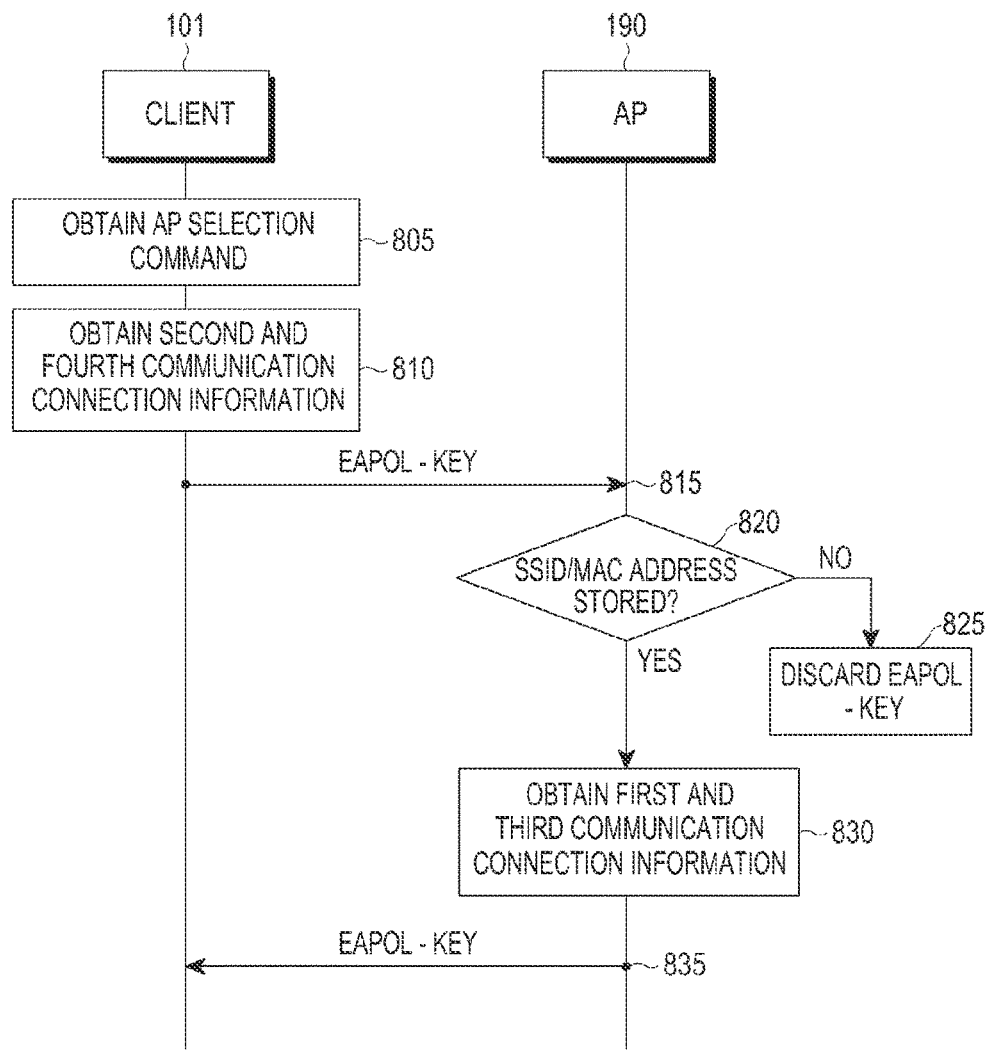
FIG. 8 is a signaling diagram illustrating an operation of an electronic device during reconnection according to various example embodiments.

FIG. 8 is a signaling diagram illustrating an operation of an electronic device during reconnection according to various example embodiments.

In operation 805, the client 101 may obtain an AP selection command. Prior to a reconnection, the client 101 may receive a beacon from the AP 190, with which its connection has been made previously. The client 101 may display a list of nearby APs based on the received beacon. The user may check the AP list displayed on the client 101, and select the AP that he/she desires to access, in the AP list. The client 101 may obtain an AP selection command based on an input from the user. If the number of received beacons is one, the client 101 may obtain an AP selection command corresponding to the received beacon without the input from the user. Even if the number of received beacons is plural, the client 101 may obtain an AP selection command on the basis of predetermined priority, without the input from the user.

In operation 810, the client 101 may obtain second and fourth communication connection information from the stored AP list. As described above, the client 101 may store the second and fourth communication connection information in association with AP identification information. The client 101 may obtain the second and fourth communication connection information associated with the AP identification information obtained from the AP selection command.

In operation 815, the client 101 may generate an encryption key EAPOL-Key based on the obtained second and fourth communication connection information, and send the generated encryption key to the AP 190.

In operation 820, the AP 190 may determine whether identification information (e.g., at least one of an SSID and a MAC address of the client 101) of the client 101, which is obtained from the encryption key, is stored in a client list.

In operation 825, if the identification information of the client 101 is not stored in the client list, the AP 190 may discard the received encryption key EAPOL-Key.

In operation 830, if the identification information of the client 101 is stored in the client list, the AP 190 may obtain first and third communication connection information associated with the obtained identification information of the client 101.

In operation 835, the AP 190 may generate an encryption key EAPOL-Key based on the obtained first and third communication connection information, and send the generated encryption key to the client 101, proceeding with a future encryption phase.

Figure 9:
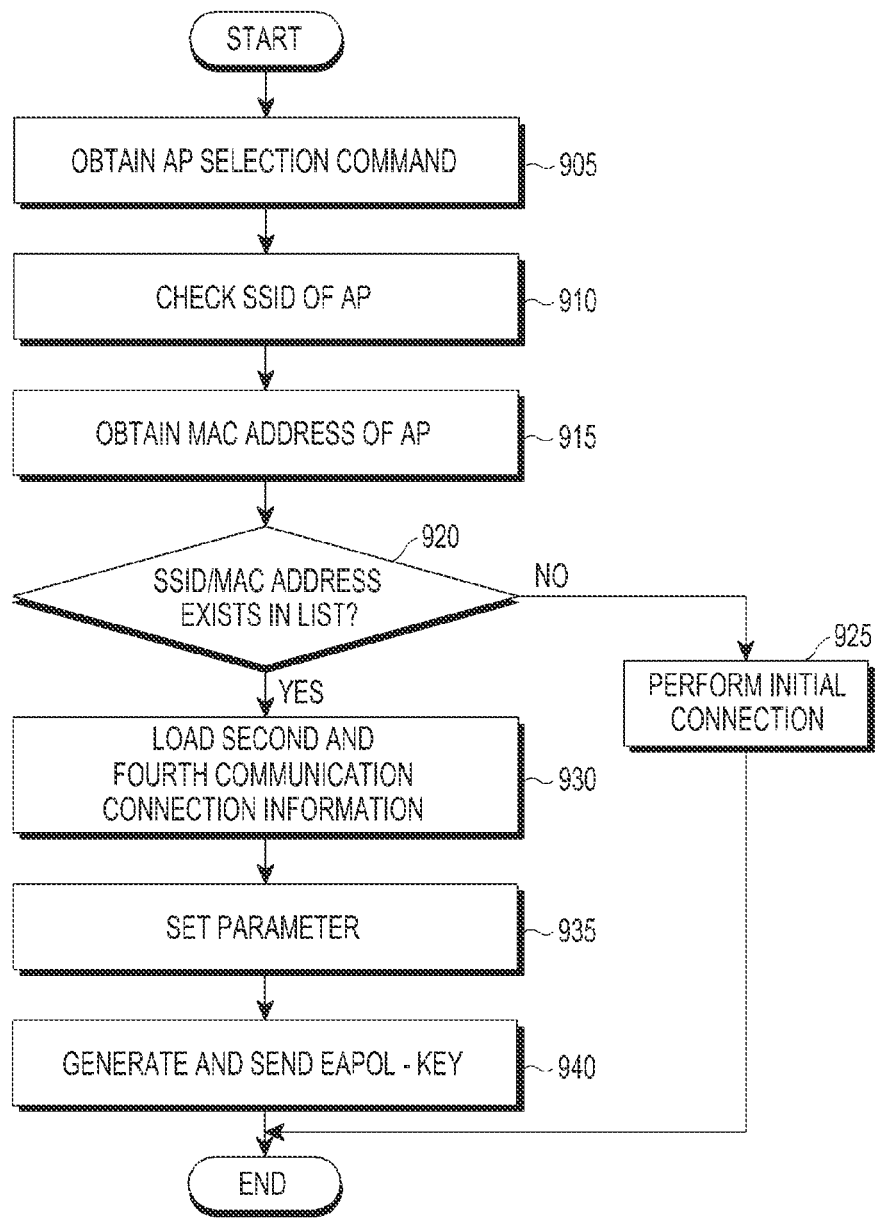
FIG. 9 is a flowchart illustrating an operation of a client during reconnection according to various example embodiments.

FIG. 9 is a flowchart illustrating an operation of a client during reconnection according to various example embodiments.

In operation 905, the client 101 may obtain an AP selection command. The AP selection command, as described above, may include identification information of the AP. In operation 910, the client 101 may check identification information (e.g., an SSID of the AP 190) of the AP 190. In operation 915, the client 101 may obtain a MAC address of the AP 190.

In operation 920, the client 101 may determine whether at least one of the obtained SSID and MAC address exists in a stored AP list. As described above, the client 101 may store the AP identification information in association with the second and fourth communication connection information.

In operation 925, if none of the obtained SSID and MAC address exists in the stored AP list, the client 101 may perform an initial connection procedure. The initial connection procedure is described in detail above with reference to FIG. 6.

In operation 930, the client 101 may load the second and fourth communication connection information associated with the AP identification information. In operation 935, the client 101 may set a parameter of an internal function based on the loaded second and fourth communication connection information.

In operation 940, the client 101 may generate an encryption key EAPOL-Key based on the set parameter, and send the generated encryption to the AP 190.

Figure 10:
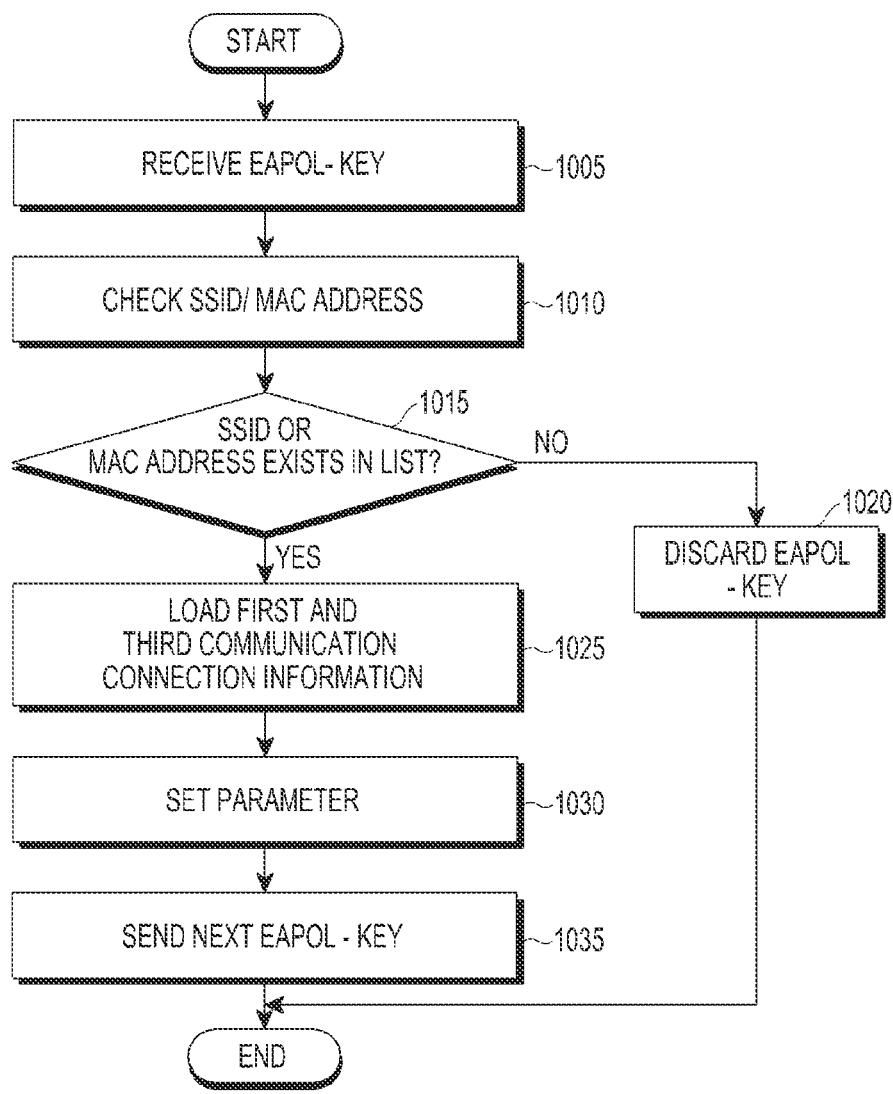
FIG. 10 is a flowchart illustrating an operation of an AP during reconnection according to various example embodiments.

FIG. 10 is a flowchart illustrating an operation of an AP during reconnection according to various example embodiments.

In operation 1005, the AP 190 may receive an encryption key EAPOL-Key from the client 101. In operation 1010, the AP 190 may check identification information (e.g., at least one of an SSID and a MAC address) of the client 101, which is obtained from the encryption key EAPOL-Key.

In operation 1015, the AP 190 may determine whether at least one of the SSID and the MAC address exists in a stored client list. As described above, the AP 190 may store the identification information of the client 101 in association with the first and third communication connection information.

In operation 1020, if none of the SSID and the MAC address exists in the stored client list, the AP 190 may discard the received encryption key EAPOL-Key.

In operation 1025, if at least one of the SSID and the MAC address exists in the stored client list, the AP 190 may load the first and third communication connection information associated with the identification information of the client 101.

In operation 1030, the AP 190 may set a parameter of an internal function based on the loaded first and third communication connection information. In operation 1035, the AP 190 may generate an encryption key EAPOL-Key based on the set parameter, and send the generated encryption key to the client 101.

Figure 11:
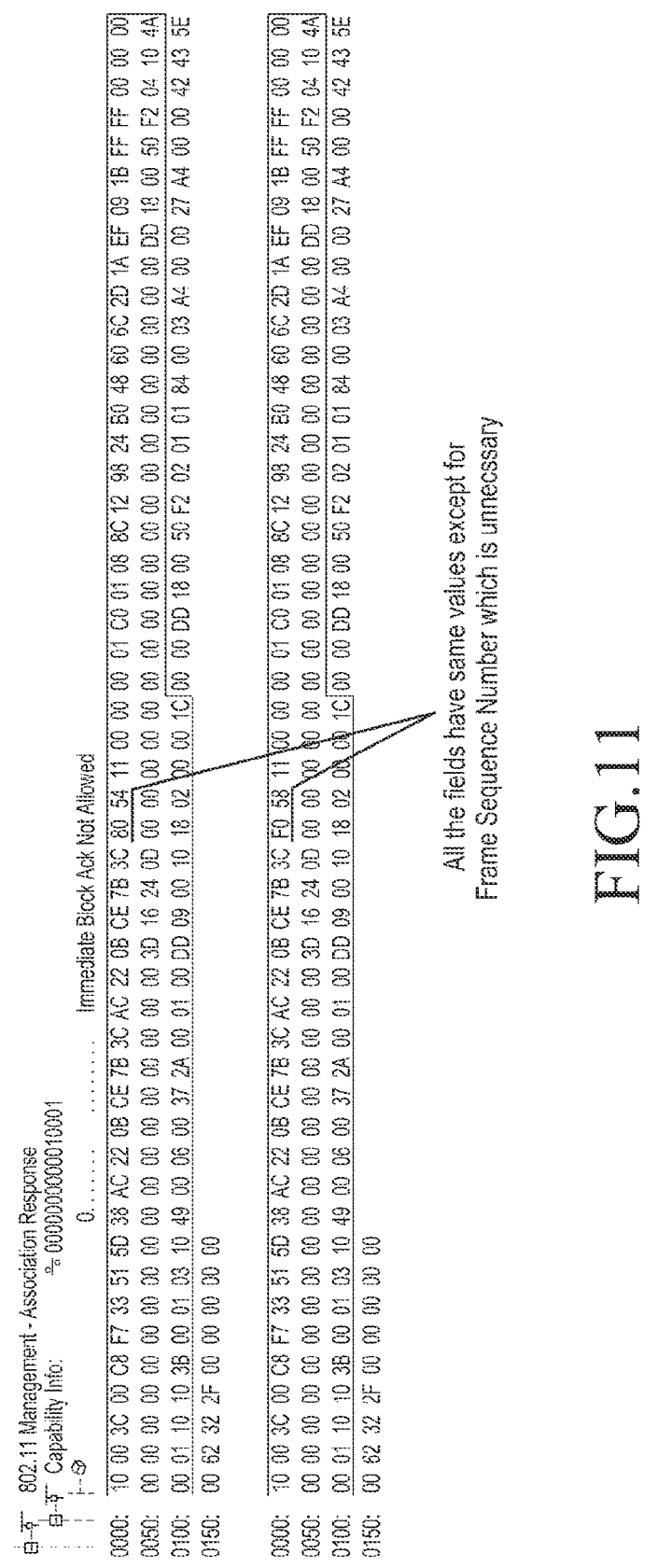

FIG. 11 illustrates association response values during initial connection and reconnection according to various example embodiments.

In FIG. 11, the data disposed on the upper side represents an association response value during initial connection, and the data disposed on the lower side represents an association response value during reconnection. In other words, the data disposed on the upper side is the data that the AP 190 was obtained by receiving it from the client 101, and the data disposed on the lower side may be the data that the AP 190 has obtained by setting a parameter of an internal function, instead of receiving it from the client 101. As shown in FIG. 11, it can be noted that the association response value during reconnection is the same as the association response value during initial connection except for the sequence number.

Figure 12:
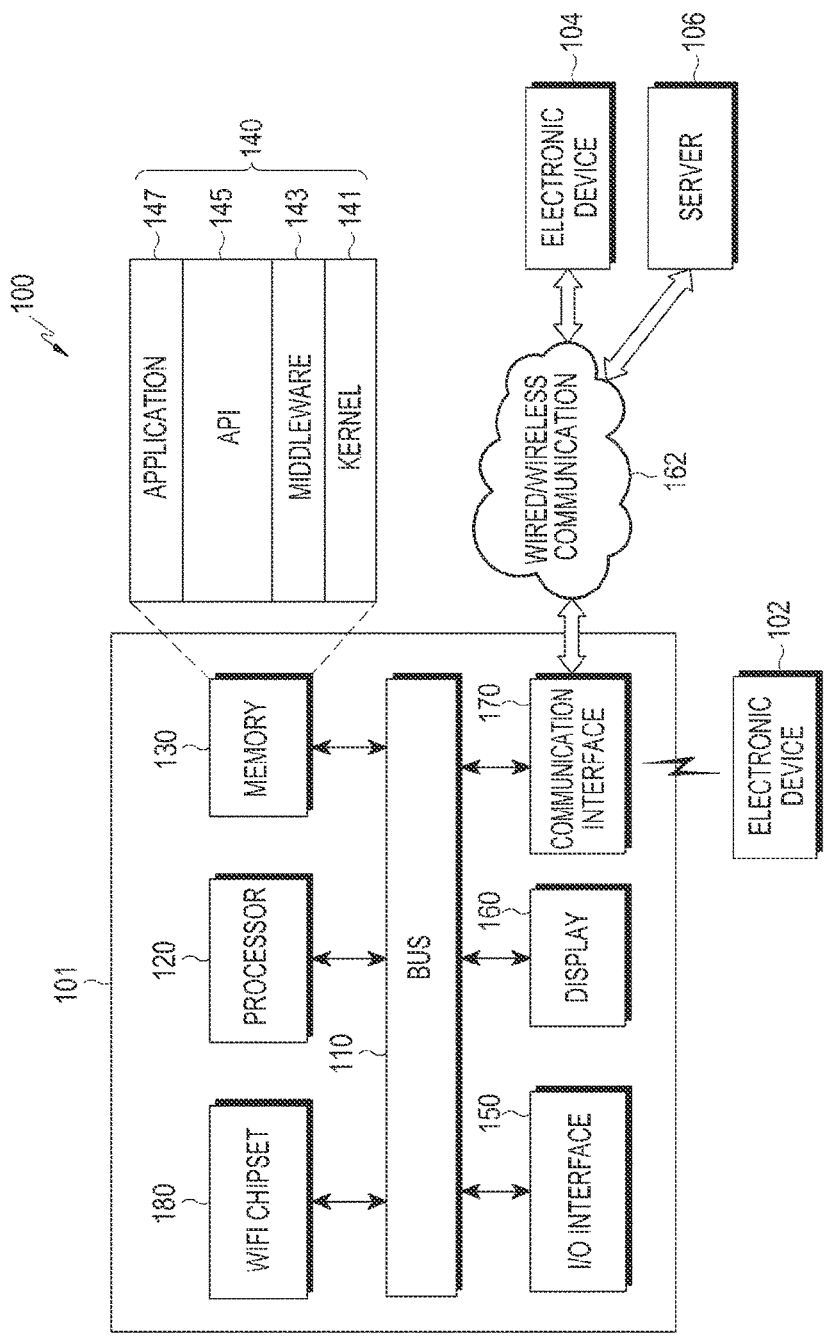
FIG. 12 illustrates a network environment including an electronic device according to various example embodiments.

FIG. 12 illustrates a network environment including an electronic device according to various example embodiments.

Referring to FIG. 12, a client 101 in a network environment 100 according to various example embodiments is disclosed. The client 101 may include a bus 110, a processor 120, a memory 130, an Input/Output (I/O) interface 150, a display 160, a communication interface 170, and a WiFi chipset 180. In some example embodiments, the client 101 may include the above components, at least one of which may be omitted, or may additionally include other components.

The bus 110 may include, for example, a circuit that connects the components 120 to 180 to each other, and delivers a communication signal (e.g., a control message and/or data) between the components.

The processor 120 may include one or more of a central processing unit (CPU), an application processor (AP) or a communication processor (CP). The processor 120 may, for example, perform an operation regarding control and/or communication of at least one other components of the client 101, or perform data processing. The processor 120 may be referred to as a controller, or may include the controller as a part thereof.

The memory 130 may include a volatile and/or non-volatile memory. The memory 130 may store, for example, the command or data related to at least one other component of the client 101. In one example embodiment, the memory 130 may store software and/or program 140. The program 140 may include, for example, a kernel 141, a middleware 143, an application programming interface (API) 145, and/or an application program (or application) 147. At least some of the kernel 141, the middleware 143 or the API 145 may be referred to as an operating system (OS).

The kernel 141 may, for example, control or manage the system resources (e.g., the bus 110, the processor 120 or the memory 130) used to perform the operation or function implemented in other programs (e.g., the middleware 143, the API 145 or the application program 147). Further, the kernel 141 may provide an interface that can control or manage the system resources, as the middleware 143, the API 145 or the application program 147 accesses individual component of the client 101.

The middleware 143 may, for example, play an intermediary role so that the API 145 or the application program 147 may exchange data through the kernel 141. Further, the middleware 143 may perform control (e.g., scheduling or load balancing) in response to work requests received from the application program 147 by using, for example, a method such as assigning a priority capable of using the system resources (e.g., the bus 110, the processor 120 or the memory 130) of the client 101 to at least one application among the application program(s) 147.

The API 145 may include, for example, at least one interface or function (e.g., a command) for, for example, file control, window control, image processing or character control, as an interface by which the application 147 controls the function provided in the kernel 141 or the middleware 143.

In this specification, the application may be referred to as an application program.

The I/O interface 150 may, for example, serve as an interface that can forward the command or data received from the user or other external devices, to other component(s) of the client 101. Further, the I/O interface 150 may output the command or data received from the other component(s) of the client 101 to the user or other external devices.

The display 160 may include, for example, a liquid crystal display (LCD) display, a light emitting diode (LED) display, an organic light emitting diode (OLED) display, a microelectromechanical systems (MEMS) display, or an electronic paper display. The display 160 may, for example, display a variety of content (e.g., texts, images, videos, icons or symbols), for the user. The display 160 may include a touch screen, and may receive the touch, gesture, proximity or hovering input that is made using, for example, an electronic pen or a part of the user's body.

The communication interface 170 may, for example, establish communication between the client 101 and the external devices (e.g., a first external electronic device 102, a second external electronic device 104, or a server 106). For example, the communication interface 170 may be connected to a network 162 through wireless communication or wired communication to communicate with the external device (e.g., the second external electronic device 104 or the server 106).

The wireless communication may include, as a cellular communication protocol for example, at least one of, for example, long term evolution (LTE), long term evolution advanced (LTE-A), code division multiple access (CDMA), wideband code division multiple access (WCDMA), universal mobile telecommunications system (UMTS), wireless broadband (WiBro), or global system for mobile communication GSM. The wired communication may include at least one of, for example, universal serial bus (USB), high definition multimedia interface (HDMI), recommended standard 232 (RS-232), or plain old telephone service (POTS). The network 162 may include a telecommunications network (e.g., at least one of a computer network (e.g., a local area network (LAN) or a wide area network (WAN)), Internet, or a telephone network).

Each of the first and second external electronic devices 102 and 104 may be a device that is the same as or different from the client 101. In one example embodiment, the server 106 may include a group of one or more servers. In various example embodiments, all or some of the operations performed in the client 101 may be performed in other one or more electronic devices (e.g., the electronic devices 102 and 104 or the server 106). In one example embodiment, if the client 101 should perform any function or service automatically or upon request, the client 101 may request other devices (e.g., the electronic devices 102 and 104, or the server 106) to perform at least some functions associated with the function or service, additionally or instead of spontaneously performing the function or service. The other electronic devices (e.g., the electronic devices 102 and 104, or the server 106) may perform the requested function or additional function, and deliver the results to the client 101. The client 101 may provide the requested function or service by processing the received results intact or additionally. To this end, for example, could computing, distributed computing, or client-server computing technologies may be used.

In one example embodiment, the WiFi chipset 180 may support the operation of the client 101 by performing at least one of the operations (or functions) implemented in the client 101.

The WiFi chipset 180 may process at least some of the information obtained from other components (e.g., at least one of the processor 120, the memory 130, the I/O interface 150 and the communication interface 170), and use the processed information in various ways. For example, the WiFi chipset 180 may control at least some functions of the client 101 using the processor 120 or independently of the processor 120 so that the client 101 may interwork with the other electronic devices (e.g., the electronic devices 102 and 104 or the server 106). The WiFi chipset 180 may be incorporated into the processor 120 or the communication interface 170. In one example embodiment, at least one component of the WiFi chipset 180 may be incorporated into the server 106, and at least one operation implemented in the WiFi chipset 180 may be supported from the server 106.

Figure 13:
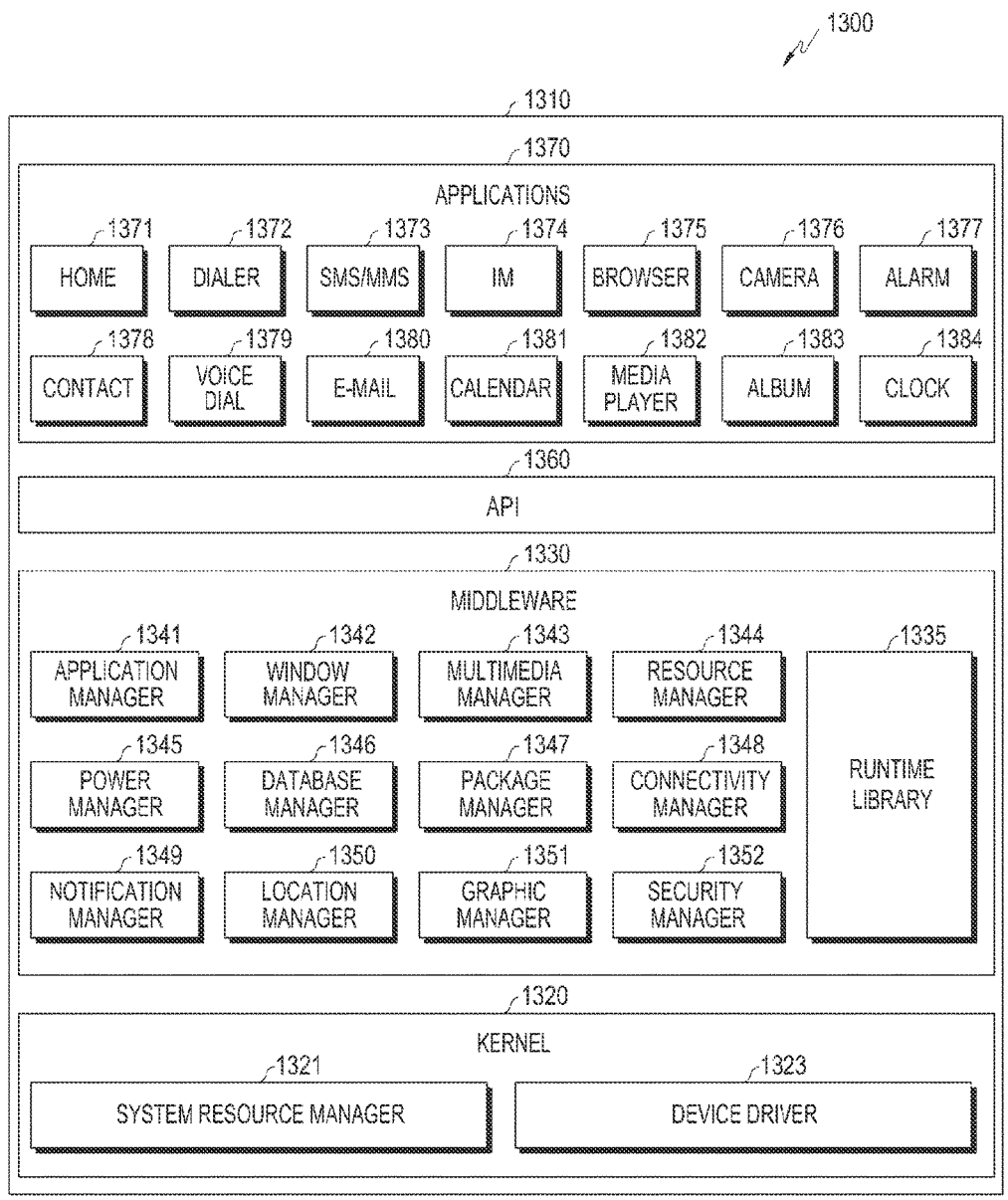
FIG. 13 is a block diagram of a program module according to various example embodiments.

FIG. 13 is a block diagram 1300 of a program module 1310 according to various example embodiments. In one example embodiment, the program module 1310 (e.g., the program 140) may include an operation system (OS) for controlling the resources related to the electronic device (e.g., the client 101), and/or various applications (e.g., application program(s) 147) that are run in the OS. The OS may be, for example, Android™, iOS™, Windows™, Symbian™, Tizen, or Bada™.

The program module 1310 may include a kernel 1320, a middleware 1330, an application programming interface (API) 1360, and/or an application(s) 1370. At least some of the components of the program module 1310 may be preloaded on the electronic device, or may be downloaded from the server (e.g., the server 106).

The kernel 1320 (e.g., the kernel 141 in FIG. 12) may include, for example, a system resource manager 1321 and/or a device driver 1323. The system resource manager 1321 may control, allocate or de-allocate the system resources. In one example embodiment, the system resource manager 1321 may include a process manager, a memory manager or a file system manager. The device driver 1323 may include, for example, a display driver, a camera driver, a Bluetooth driver, a shared memory driver, a USB driver, a keypad driver, a WiFi driver, an audio driver, or an inter-process communication (IPC) driver.

The middleware 1330 may, for example, provide the function that the application(s) 1370 requires in common, or may provide various functions to the application 1370 through the API 1360 so that the application 1370 may efficiently use the limited system resources in the electronic device. In one example embodiment, the middleware 1330 (e.g., the middleware 143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, or a security manager 1352.

The runtime library 1335 may include, for example, a library module that a compiler uses to add a new function through a program language while the application 1370 is run. The runtime library 1335 may perform functions for input/output management, memory management, or arithmetic functions management.

The application manager 1341 may, for example, manage the life cycle of at least one application among the applications 1370. The window manager 1342 may manage the graphic user interface (GUI) resources used in the screen. The multimedia manager 1343 may determine a format required for playback of various media files, and perform encoding or decoding on a media file using a codec for the format. The resource manager 1344 may manage resources such as resource code, memory or storage space for at least one application among the applications 1370.

The power manager 1345 may, for example, manage the battery or power by operating together with a basic input/ output system (BIOS), and provide power information required for operation of the electronic device. The database manager 1346 may generate, search or modify the database to be used in at least one application among the applications 1370. The package manager 1347 may manage installation or update of an application that is distributed in the form of a package file.

The connectivity manager 1348 may manage wireless connection such as, for example, WiFi or Bluetooth. The notification manager 1349 may indicate or notify events such as notification of message arrival, appointment or proximity, in a manner that does not interfere with the user. The location manager 1350 may mange the location information of the electronic device. The graphic manager 1351 may manage the graphic effects to be provided to the user, or the associated user interface. The security manager 1352 may provide various security functions required for the system security or user authentication. In one example embodiment, if the electronic device (e.g., the client 101) includes a phone function, the middleware 1330 may further include a telephony manager for managing the voice or video call function of the electronic device.

The middleware 1330 may include a middleware module for forming a combination of various functions of the above-described components. The middleware 1330 may provide a specialized module for each type of the OS to provide a differentiated function. Further, the middleware 1330 may dynamically delete some of the existing components, or add new components.

The API 1360 (e.g., the API 145), which is a set of API programming functions, may be provided, for example, in different configuration depending on the OS. For example, in the case of Android™ or iOS™, the API 1360 may provide one API set per platform, and in the case of Tizen™, the API 1360 may provide two or more API sets per platform.

The application 1370 (e.g., the application program 147) may, for example, include one or more applications capable of providing functions such as home 1371, dialer 1372, short message service (SMS)/multimedia messaging service (MMS) 1373, instant message (IM) 1374, browser 1375, camera 1376, alarm 1377, contact 1378, voice dial 1379, e-mail 1380, calendar 1381, media player 1382, album 1383, clock 1384, health care (e.g., measurement of exercise or blood glucose), or environment information provision (e.g., provision of pressure, humidity or temperature information).

In one example embodiment, the application 1370 may include an application (hereinafter, referred to as an 'information exchange application' for convenience of description) for supporting information exchange between the electronic device (e.g., the client 101) and the external electronic device (e.g., the electronic devices 102 and 104). The information exchange application may include, for example, a notification relay application for relaying specific information to the external electronic device, or a device management application for managing the external electronic device.

For example, the notification relay application may include a function of relaying the notification information generated in other applications (e.g., the SMS/MMS application, the e-mail application, the healthcare application, or the environmental information application) of the electronic device, to the external electronic device (e.g., the electronic devices 102 and 104). Further, the notification relay application may, for example, receive notification information from the external electronic device and provide the notification information to the user. The device management application may, for example, manage at least one function (e.g., turn-on/off of all or some of the components of the external electronic device or adjustment of the brightness (or resolution) of the display) of the external electronic device (e.g., the electronic devices 102 and 104) communicating with the electronic device, or manage (e.g., install, delete or update) the application operating in the external electronic device or the service (e.g., a call service or a messaging service) provided by the external electronic device.

In one example embodiment, the application 1370 may include an application (e.g., a healthcare application) that is specified depending on the properties (e.g., the properties of the electronic device, indicating that the type of the electronic device is a mobile medical device) of the external electronic device (e.g., the electronic devices 102 and 104). In one example embodiment, the application 1370 may include an application received from the external electronic device (e.g., the server 106 or the electronic devices 102 and 104). In one example embodiment, the application 1370 may include a preloaded application, or a third party application that can be downloaded from the server. Names of the components of the program module 1310 according to an example embodiment may vary depending on the type of the OS.

In various example embodiments, at least some of the program module 1310 may be implemented by software, firmware, hardware or a combination thereof. At least some of the program module 1310 may be implemented by, for example, a processor (e.g., the processor 120). At least some of the program module 1310 may include, for example, a module, a program, a routine, an instruction set or a process, for implementing one or more functions.

According to an example embodiment, an electronic device may include a communication module; a memory configured to store communication connection information for communication connection with an external electronic device; and a processor configured to, upon a communication connection request with the external electronic device, perform communication connection with the external electronic device using pre-stored communication connection information, if the pre-stored communication connection information exists.

According to an example embodiment, if the pre-stored communication connection information does not exist, the processor may perform exchange of communication connection information with the external electronic device, and perform communication connection with the external electronic device using the exchanged communication connection information.

According to an example embodiment, the communication module may be a WiFi communication module.

According to an example embodiment, the communication connection information may include Capability Information, SSID information, and Supported Rates information.

According to an example embodiment, the communication connection information may further include at least one of RSN information, HT Capability Information, WPA information, Vendor Specific information, and WMM information.

According to an example embodiment, to perform the exchange of communication connection information, the processor may receive a Probe Response signal from the external electronic device by sending a Probe Request signal to the external electronic device, receive an Authentication signal from the external electronic device by sending an Authentication signal to the external electronic device, and receive an Association Response signal from the external electronic device by sending an Association Request signal to the external electronic device.

According to an example embodiment, the processor may be configured to perform communication connection with the external electronic device by transmitting an encryption key packet that is an extensible authentication protocol over local area network key (EAPOL-Key) packet to the external electronic device after setting a parameter for connecting communication using the communication connection information.

According to an example embodiment, a method for connecting communication in an electronic device may include storing communication connection information for communication connection with an external electronic device; and upon a communication connection request with the external electronic device, performing communication connection with the external electronic device using pre-stored communication connection information, if the pre-stored communication connection information exists.

According to an example embodiment, the communication connection method may further include performing exchange of communication connection information with the external electronic device, if the pre-stored communication connection information does not exist; storing the exchanged communication connection information; and performing communication connection with the external electronic device using the exchanged communication connection information.

According to an example embodiment, the communication connection may be WiFi communication connection.

According to an example embodiment, the communication connection information may include Capability Information, SSID information, and Supported Rates information.

According to an example embodiment, the communication connection information may further include at least one of RSN information, HT Capability Information, WPA information, Vendor Specific information, and WMM information.

According to an example embodiment, performing exchange of communication connection information with the external electronic device may include receiving a Probe Response signal from the external electronic device by sending a Probe Request signal to the external electronic device; receiving an Authentication signal from the external electronic device by sending an Authentication signal to the external electronic device; and receiving an Association Response signal from the external electronic device by sending an Association Request signal to the external electronic device.

According to an example embodiment, performing communication connection with the external electronic device may include transmitting an encryption key packet that is an extensible authentication protocol over local area network key (EAPOL-Key) packet to the external electronic device after setting a parameter for connecting communication using the communication connection information.

According to an example embodiment, a storage medium may store a communication connection program in an electronic device. The communication connection program may include storing communication connection information for communication connection with an external electronic device; and upon a communication connection request with the external electronic device, performing communication connection with the external electronic device using pre-stored communication connection information, if the pre-stored communication connection information exists.

According to an example embodiment, a method for connecting communication with an AP in a WiFi client may include obtaining an AP selection command for the AP; obtaining an SSID of the AP from the obtained AP selection command, and sending a Probe Request signal including the SSID of the AP; receiving a Probe Response signal from the AP; parsing the received Probe Response signal and storing second communication connection information based on the parsing result; sending an Authentication signal to the AP, and receiving an Authentication signal from the AP; sending an Association Request signal to the AP; receiving an Association Response signal from the AP; parsing the received Association Response signal and storing fourth communication connection information based on the parsing result; and generating an encryption key and sending the encryption key to the AP.

According to an example embodiment, a method for connection communication with a client in a WiFi AP may include receiving a Probe Request signal including an SSID of the AP; parsing the received Probe Request signal and storing first communication connection information based on the parsing result; sending a Probe Response signal to the client; receiving an Authentication signal from the client, and sending an Authentication signal to the client; receiving an Association Request signal from the client; parsing the received Association Request signal, and storing third communication connection information based on the parsing result; sending an Association Response signal to the client; and receiving an encryption key from the client.

According to an example embodiment, a method for connecting communication with an AP in a WiFi client may include obtaining an AP selection command for the AP; obtaining an SSID of the AP from the obtained AP selection command, and determining whether the SSID exists in a pre-stored AP list; if the SSID exists in the AP list, obtaining second and fourth communication connection information corresponding to the SSID; and generating an encryption key based on at least one of the obtained second and fourth communication connection information, and sending the encryption key to the AP.

According to an example embodiment, the second communication connection information may be information related to a Probe Response signal previously received from the AP, and the fourth communication connection information may be information related to an Association Response signal previously received from the AP.

According to an example embodiment, a method for connecting communication with a client in a WiFi AP may include receiving an encryption key including an SSID of the client; determining whether the SSID obtained from the received encryption key exists in a pre-stored client list; if the SSID exists in the client list, obtaining first and third communication connection information corresponding to the SSID; and generating an encryption key based on at least one of the obtained first and third communication connection information, and transmitting the encryption key to the client.

According to an example embodiment, the first communication connection information may be information related to a Probe Request signal previously received from the client, and the third communication connection information may be information related to an Association Request signal previously received from the client.

Figure 14:
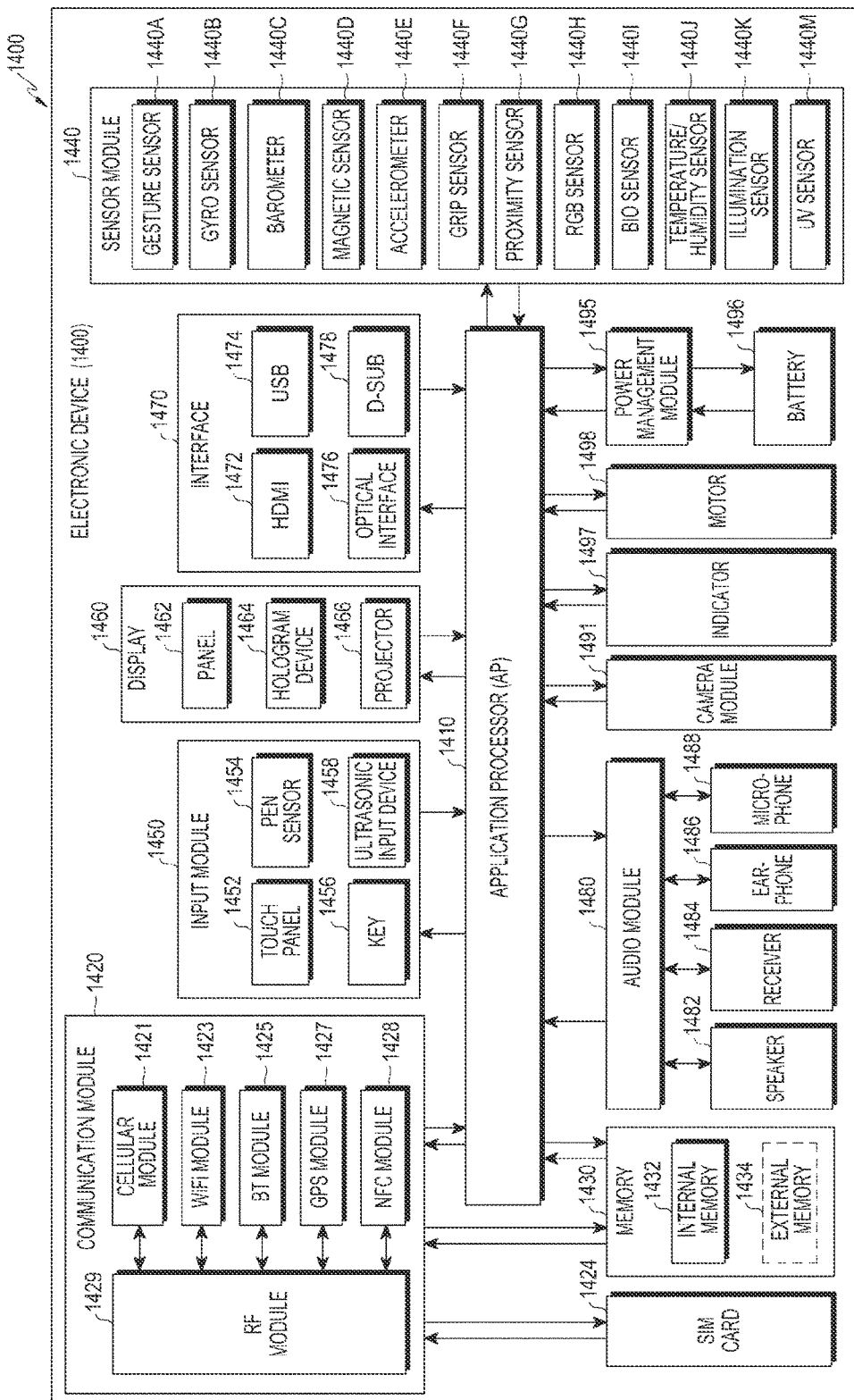
FIG. 14 is a block diagram of an electronic device according to various example embodiments.

FIG. 14 is a block diagram 1400 of an electronic device 1401 according to various example embodiments. The electronic device 1401 may include, for example, the whole or part of the client 101 shown in FIG. 12. The electronic device 1401 may include one or more application processor (AP) 1410, a communication module 1420, a subscriber identification module (SIM) card 1424, a memory 1430, a sensor module 1440, an input device 1450, a display 1460, an interface 1470, an audio module 1480, a camera module 191, a power management module 1495, a battery 1496, an indicator 1497, and a motor 1498.

The AP 1410 may control a plurality of hardware or software components connected to the AP 1410 by running, for example, the OS or the application program, and may perform various data processing and operations. The AP 1410 may be implemented as, for example, a system on chip (SoC). In one example embodiment, the AP 1410 may further include a graphic processing unit (GPU) and/or an image signal processor (ISP). The AP 1410 may include at least some (e.g., a cellular module 1421) of the components shown in FIG. 14. The AP 1410 may load, on a volatile memory, the command or data received from at least one of the other components (e.g., a non-volatile memory), and process the loaded data, and may store various data in a non-volatile memory.

The communication module 1420 may have the structure that is the same as or similar to the communication interface 170 in FIG. 12. The communication module 1420 may include, for example, the cellular module 1421, a WiFi module 1423, a Bluetooth (BT) module 1425, a GPS module 1427, a near field communication (NFC) module 1428, and a radio frequency (RF) module 1429.

The cellular module 1421 may, for example, provide a voice call service, a video call service, a messaging service or an Internet service over the communication network. In one example embodiment, the cellular module 1421 may perform identification and authentication of the electronic device 1401 in the communication network using a subscriber identification module (e.g., the SIM card 1424). In one example embodiment, the cellular module 1421 may perform at least some of the functions that can be provided by the AP 1410. In one example embodiment, the cellular module 1421 may include a communication processor (CP).

Each of the WiFi module 1423, the BT module 1425, the GPS module 1427 or the NFC module 1428 may include, for example, a processor for processing the data that is transmitted or received through the corresponding module. In some example embodiments, at least some (e.g., two or more) of the cellular module 1421, the WiFi module 1423, the BT module 1425, the GPS module 1427 or the NFC module 1428 may be incorporated into one integrated chip (IC) or IC package.

The RF module 1429 may, for example, transmit or receive a communication signal (e.g., an RF signal). The RF module 1429 may include, for example, a transceiver, a power AMP module (PAM), a frequency filter, a low noise amplifier (LNA) or an antenna. In another example embodiment, at least one of the cellular module 1421, the WiFi module 1423, the BT module 1425, the GPS module 1427 or the NFC module 1428 may transmit and receive an RF signal through a separate RF module.

The SIM card 1424 may, for example, include a card with a subscriber identification module and/or an embedded SIM, and include unique identification information (e.g., integrated circuit card identifier (ICCID)) or subscriber information (e.g., international mobile subscriber identity (IMSI)).

The memory 1430 (e.g., the memory 130) may include, for example, an internal memory 1432 or an external memory 1434. The internal memory 1432 may include at least one of, for example, a volatile memory (e.g., a dynamic RAM (DRAM), a static RAM (SRAM) or a synchronous dynamic RAM (SDRAM)), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD)).

The external memory 1434 may further include a flash drive (e.g., compact flash (CF), secure digital (SD), micro secure digital (Micro-SD), mini secure digital (Mini-SD) or extreme digital (xD)) or a memory stick. The external memory 1434 may be functionally or physically connected to the electronic device 1401 through various interfaces.

The sensor module 1440 may, for example, measure the physical quantity or detect the operating status of the electronic device 1401, and convert the measured or detected information into an electrical signal. The sensor module 1440 may include at least one of, for example, a gesture sensor 1440A, a gyro sensor 1440B, a barometer 1440C, a magnetic sensor 1440D, an accelerometer 1440E, a grip sensor 1440F, a proximity sensor 1440G, a color sensor (or red, green, blue (RGB) sensor) 1440H, a biosensor 14401, a temperature/humidity sensor 1440J, an illumination sensor 1440K, or a ultra violet (UV) sensor 1440M. Additionally or alternatively, the sensor module 1440 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling one or more sensors included therein. In some example embodiments, the electronic device 1401 may further include a processor that is configured as a part of the AP 1410 or separately configured, so as to control the sensor module 1440. Thus, while the AP 1410 is in the sleep state, the electronic device 1401 may control the sensor module 1440.

The input device 1450 may include, for example, a touch panel 1452, a (digital) pen sensor 1454, a key 1456, or an ultrasonic input device 1458. The touch panel 1452 may use at least one of, for example, a capacitive scheme, a resistive scheme, an IR scheme or an ultrasonic scheme. The touch panel 1452 may further include a control circuit. The touch panel 1452 may further include a tactile layer to provide a tactile feedback or response to the user.

The (digital) pen sensor 1454 may include, for example, a separate recognition sheet, which is a part of the touch panel. The key 1456 may include, for example, a physical button, an optical key or a keypad. The ultrasonic input device 1458 may check the data by detecting sound waves in the electronic device 1401 with a microphone (e.g., a microphone 1488) through the input tool that generates an ultrasonic signal.

The display 1460 (e.g., the display 160) may include a panel 1462, a hologram device 1464, or a projector 1466. The panel 1462 may have the structure that is the same as or similar to the display 160 in FIG. 12. The panel 1462 may be implemented to be, for example, flexible, transparent, or wearable. The panel 1462, together with the touch panel 1452, may be configured as one module. The hologram device 1464 may show stereoscopic images in the air using the interference of the light. The projector 1466 may display images by projecting the light on the screen. The screen may be disposed in, for example, inside or outside of the electronic device 1401. In one example embodiment, the display 1460 may further include a control circuit for controlling the panel 1462, the hologram device 1464 or the projector 1466.

The interface 1470 may include, for example, an HDMI 1472, a USB 1474, an optical interface 1476, or D-subminiature (D-sub) 1478. The interface 1470 may, for example, be incorporated into the communication interface 170 shown in FIG. 12. Additionally or alternatively, the interface 1470 may include, for example, mobile high-definition link (MHL) interface, a secure digital (SD) card/multi-media card (MMC) interface, or a infrared data association (IrDA) interface.

The audio module 1480 may, for example, convert the sound into an electronic signal, or vice versa. At least some of the components of the audio module 1480 may, for example, be incorporated into the I/O interface 150 shown in FIG. 12. The audio module 1480 may process, for example, the sound information that is input or output through a speaker 1482, a receiver 1484, an earphone 1486, or a microphone 1488.

The camera module 1491 may be, for example, a device that can capture still images or videos. In one example embodiment, the camera module 1491 may include one or more image sensors (e.g., a front image sensor or a rear image sensor), a lens, an ISP, or a flash (e.g., an LED or xenon lamp).

The power management module 1495 may, for example, manage the power of the electronic device 1401. In one example embodiment, the power management module 1495 may include a power management integrated circuit (PMIC), a charger integrated circuit (IC), or a battery or fuel gauge. The PMIC may have a wired/wireless charging scheme. The wireless charging scheme may include, for example, a magnetic resonance scheme, a magnetic induction scheme, or an electromagnetic scheme, and may further include additional circuits (e.g., a loop coil, a resonance circuit, or a rectifier) for wireless charging. The battery or fuel gauge may, for example, measure the remaining capacity, the charging voltage, the charging current or the temperature of the battery 1496. The battery 1496 may include, for example, a rechargeable battery and/or a solar battery.

The indicator 1497 may indicate particular sates (e.g., boot state, message state or charging state) of some components (e.g., the AP 1410) of the electronic device 1401). The motor 1498 may convert an electrical signal into mechanical vibrations, and may generate vibration or haptic effects. Although not shown, the electronic device 1401 may include a processing device (e.g., a GPU) for support of mobile TV. The processing device for support of mobile TV may, for example, process the media data that is based on digital multimedia broadcasting (DMB), digital video broadcasting (DVB) or MediaFLO™.

Each of the above-described components of the electronic device according to various example embodiments may include one or more parts, and the names of the components may vary depending on the type of the electronic device. The electronic device according to various example embodiments may include at least one of the above components, some of which may be omitted, or may further include other additional components. Some of the components of the electronic device according to various example embodiments may be configured as one entity by being combined, so the entity may perform the previous functions of the components in the same way.

As used herein, the term 'module' may refer to a unit that includes one of, or a combination of, for example, hardware, software or firmware. The term 'module' may be interchangeably used with the terms such as, for example, unit, logic, logical block, component or circuit. The module may be the minimum unit of a component that is configured as a single body, or a part thereof. The module may be the minimum unit that performs one or more functions, or a part thereof. The module may be implemented mechanically or electronically. For example, the module may include at least one of an Application-Specific Integrated Circuit (ASIC) chip, a Field-Programmable Gate Arrays (FPGAs) chip or a programmable-logic device, which have been known, or will be developed in the future, and which may perform any operations.

At least a portion of the device (modules or their functions) or method (operations) according to various example embodiments may be implemented by, for example, a command that is stored in a computer-readable storage media in the form of a programming module. If the command is executed by at least one processor (e.g., the processor 120), the at least one processor may perform a function corresponding to the command. The computer-readable storage media may be, for example, the memory 130.

The computer-readable storage media may include a hard disk, a floppy disk, magnetic media (e.g., magnetic tape), optical media (e.g., Compact Disc Read Only Memory (CD-ROM) and Digital Versatile Disc (DVD)), magneto-optical media (e.g., floptical disk)), and a hardware device (e.g., Read Only Memory (ROM), Random Access Memory (RAM) or flash memory). In addition, the program command may include not only the machine code made by the compiler, but also the high-level language code that can be executed by the computer using the interpreter and the like. The hardware device may be configured to operate as one or more software modules to perform the operations according to various example embodiments, and vice versa.

The module or programming module according to various example embodiments may include at least one of the above-described components, some of which can be omitted, or may further include other additional components. The operations performed by the module, the programming module or other components according to various example embodiments may be performed in a sequential, parallel, iterative or heuristic manner. In addition, some operations may be performed in a different order, or omitted, or other operations may be added.

According to various example embodiments, in a storage medium that stores instructions, when the instructions are executed by at least one processor, the instructions may be set to allow the at least one processor to perform at least one operation. The at least one operation may include storing communication connection information for communication connection with an external electronic device; and upon a communication connection request with the external electronic device, performing communication connection with the external electronic device using pre-stored communication connection information, if the pre-stored communication connection information exists.

The example embodiments disclosed herein have been presented for the description and understanding of the disclosure, and are not intended to limit the scope of the disclosure. Therefore, the scope of the disclosure should be construed to include all modifications based on the spirit of the disclosure, or various other example embodiments As is apparent from the foregoing description, according to various example embodiments, when an electronic device reconnects with an opponent device, with which its connection has been made previously, the electronic device may omit at least one procedure for searching for, recognizing and authenticating the opponent device.

An aspect of various example embodiments may provide an electronic device and communication connection method for storing communication connection information related to an opponent device, with which its connection has been made previously.

Another aspect of various example embodiments may provide an electronic device and communication connection method for making a communication connection based on the stored communication connection information, when reconnecting with an opponent device, with which its connection has been made previously.

While the disclosure has been shown and described with reference to certain example embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication module comprising communication circuitry;
   a memory configured to store communication connection information for communication connection with an external electronic device; and
   a processor configured to establish a communication connection with the external electronic device by transmitting extensible authentication protocol over local area network (EAPOL) including pre-stored communication connection information without transmitting a probe request and receiving a probe response, if the pre-stored communication connection information exists, upon a communication connection request with the external electronic device,
   wherein the pre-stored communication connection information includes first communication connection information associated with a Probe Response signal received from the external electronic device and second communication connection information associated with an Association Response signal received from the external electronic device.

2. The electronic device of claim 1, wherein if the pre-stored communication connection information does not exist, the processor is configured to perform exchange of communication connection information with the external electronic device, and to perform communication connection with the external electronic device using the exchanged communication connection information.

3. The electronic device of claim 2, wherein the communication module is a wireless fidelity (WiFi) communication module.

4. The electronic device of claim 3, wherein the first communication connection information includes at least one of Capability Information, Service Set Identifier (SSID) information, Supported Rates information, Robust Security Network (RSN) information, High-Throughput (HT) Capability information, additional HT information, Wi-Fi Protected Access (WPA) information, Vendor Specific information, and Wi-Fi Multimedia (WMM) information.

5. The electronic device of claim 3, wherein the second communication connection information includes at least one of Capability Information, Service Set Identifier (SSID) information, Supported Rates information, Robust Security Network (RSN) information, High-Throughput (HT) Capability Information, Vendor Specific information, and Wi-Fi Multimedia (WMM) information.

6. The electronic device of claim 3, wherein the processor is configured to perform the exchange of communication connection information, and receives the Probe Response signal from the external electronic device by sending a Probe Request signal to the external electronic device, receives an Authentication signal from the external electronic device by sending an Authentication signal to the external electronic device, and receives the Association Response signal from the external electronic device by sending an Association Request signal to the external electronic device.

7. The electronic device of claim 6, wherein the processor is configured to establish the communication connection with the external electronic device by transmitting an encryption key packet comprises an extensible authentication protocol over local area network key (EAPOL-Key) packet to the external electronic device after setting a parameter for connecting communication using the communication connection information.

8. A method for establishing a communication connection in an electronic device, comprising:
   storing communication connection information for communication connection with an external electronic device; and
   upon a communication connection request with the external electronic device, performing communication connection with the external electronic device by transmitting extensible authentication protocol over local area network (EAPOL) including pre-stored communication connection information without transmitting a probe request and receiving a probe request, if the pre-stored communication connection information exists,
   wherein the pre-stored communication connection information includes first communication connection information associated with a Probe Response signal received from the external electronic device and second communication connection information associated with an Association Response signal received from the external electronic device.

9. The method of claim 8, further comprising:
   performing exchange of communication connection information with the external electronic device, if the pre-stored communication connection information does not exist;
   storing the exchanged communication connection information; and
   performing communication connection with the external electronic device using the exchanged communication connection information.

10. The method of claim 9, wherein the communication connection is wireless fidelity (WiFi) communication connection.

11. The method of claim 10, wherein the first communication connection information includes at least one of Capability Information, Service Set Identifier (SSID) information, Supported Rates information, Robust Security Network (RSN) information, High-Throughput (HT) Capability information, additional HT information, Wi-Fi Protected Access (WPA) information, Vendor Specific information, and Wi-Fi Multimedia (WMM) information.

12. The method of claim 10, wherein the second communication connection information includes at least one of Capability Information, Service Set Identifier (SSID) information, Supported Rates information, Robust Security Network (RSN) information, High-Throughput (HT) Capability Information, Vendor Specific information, and Wi-Fi Multimedia (WMM) information.

13. The method of claim 10, wherein performing exchange of communication connection information with the external electronic device includes:
  receiving the Probe Response signal from the external electronic device by sending a Probe Request signal to the external electronic device;
  receiving an Authentication signal from the external electronic device by sending an Authentication signal to the external electronic device; and
  receiving the Association Response signal from the external electronic device by sending an Association Request signal to the external electronic device.

14. The method of claim 13, wherein performing communication connection with the external electronic device comprises transmitting an encryption key packet comprising an extensible authentication protocol over local area network key (EAPOL-Key) packet to the external electronic device after setting a parameter for connecting communication using the communication connection information.

15. A non-transitory computer-readable storage medium storing a communication connection program which, when executed by a computer of an electronic device, controls the electronic device to perform operations comprising:
  storing communication connection information for communication connection with an external electronic device; and
  upon a communication connection request with the external electronic device, performing communication connection with the external electronic device by transmitting extensible authentication over local area network (EAPOL) including pre-stored communication connection information without transmitting a probe request and receiving a probe response, if the pre-stored communication connection information exists,
  wherein the pre-stored communication connection information includes first communication connection information associated with a Probe Response signal received from the external electronic device and second communication connection information associated with an Association Response signal received from the external electronic device.

16. A method for establishing a communication connection with an access point (AP) in a wireless fidelity (WiFi) client, comprising:
  obtaining an AP selection command for the AP;
  obtaining a Service Set Identifier (SSID) of the AP from the obtained AP selection command, and sending a Probe Request signal including the SSID of the AP;
  receiving a Probe Response signal from the AP;
  parsing the received Probe Response signal and storing second communication connection information based on the parsing result associated with the received Probe Response signal;
  sending an Authentication signal to the AP, and receiving an Authentication signal from the AP;
  sending an Association Request signal to the AP;
  receiving an Association Response signal from the AP;
  parsing the received Association Response signal and storing fourth communication connection information based on the parsing result associated with the received Association Response signal; and
  generating an encryption key and sending the encryption key to the AP.

17. A method for establishing a communication connection with a client in a wireless fidelity (WiFi) access point (AP), comprising:
  receiving a Probe Request signal including a Service Set Identifier (SSID) of the AP;
  parsing the received Probe Request signal and storing first communication connection information based on the parsing result associated with the received Probe Request signal;
  sending a Probe Response signal to the client;
  receiving an Authentication signal from the client, and sending an Authentication signal to the client;
  receiving an Association Request signal from the client;
  parsing the received Association Request signal, and storing third communication connection information based on the parsing result associated with the received Association Request signal;
  sending an Association Response signal to the client; and
  receiving an encryption key from the client.

18. A method for establishing a communication connection with an access point (AP) in a wireless fidelity (WiFi) client, comprising:
  obtaining an AP selection command for the AP;
  obtaining a Service Set Identifier (SSID) of the AP from the obtained AP selection command, and determining whether the SSID exists in a pre-stored AP list;
  obtaining second and fourth communication connection information corresponding to the SSID if the SSID exists in the AP list, wherein the second communication connection information is associated with a Probe Response signal received from the access point and fourth communication connection information is associated with an Association Response signal received from the access point; and
  generating an encryption key based on at least one of the obtained second and fourth communication connection information, and sending the encryption key to the AP.

19. The method of claim 18, wherein the second communication connection information includes at least one of Capability Information, Service Set Identifier (SSID) information, Supported Rates information, Robust Security Network (RSN) information, High-Throughput (HT) Capability information, additional HT information, Wi-Fi Protected Access (WPA) information, Vendor Specific information, and Wi-Fi Multimedia (WMM) information, and the fourth communication connection information includes at least one of Capability Information, Service Set Identifier (SSID) information, Supported Rates information, Robust Security Network (RSN) information, High-Throughput (HT) Capability Information, Vendor Specific information, and Wi-Fi Multimedia (WMM) information.

20. A method for establishing a communication connection with a client in a wireless fidelity (WiFi) access point (AP), comprising:
  receiving an encryption key including a Service Set Identifier (SSID) of the client;
  determining whether the SSID obtained from the received encryption key exists in a pre-stored client list;
  obtaining first and third communication connection information corresponding to the SSID if the SSID exists in the client list, wherein the first communication connection information is associated with a Probe Request signal received from the client and third communication connection information is associated with an Association Request signal received from the client; and
  generating an encryption key based on at least one of the obtained first and third communication connection information, and transmitting the encryption key to the client.

21. The method of claim 20, wherein the first communication connection information includes at least one of Capability Information, Service Set Identifier (SSID) information, Supported Rates information, Robust Security Network (RSN) information, High-Throughput (HT) Capability information, additional HT information, Wi-Fi Protected Access (WPA) information, Vendor Specific information, and Wi-Fi Multimedia (WMM) information, and the third communication connection information includes at least one of Capability Information, Service Set Identifier (SSID) information, Supported Rates information, Robust Security Network (RSN) information, High-Throughput (HT) Capability Information, Vendor Specific information, and Wi-Fi Multimedia (WMM) information.

\* \* \* \* \*